(12) United States Patent
Faber et al.

(10) Patent No.: US 11,034,235 B2
(45) Date of Patent: Jun. 15, 2021

(54) SYSTEMS AND METHODS FOR CREATING AND AUTOMATING AN ENCLOSED VOLUME WITH A FLEXIBLE FUEL TANK AND PROPELLANT METERING FOR MACHINE OPERATIONS

(71) Applicant: Orbit Fab, Inc., Santa Clara, CA (US)

(72) Inventors: Daniel Faber, Cupertino, CA (US); James Bultitude, San Francisco, CA (US); Jeremy Schiel, San Jose, CA (US); Eric Weinhoffer, Alameda, CA (US); Andrew Witte, Palo Alto, CA (US); Tyler Mincey, San Francisco, CA (US)

(73) Assignee: ORBIT FAB, INC., Santa Clara, CA (US)

(*) Notice: Subject to any disclaimer, the term of this patent is extended or adjusted under 35 U.S.C. 154(b) by 80 days.

(21) Appl. No.: 16/211,095

(22) Filed: Dec. 5, 2018

(65) Prior Publication Data

US 2019/0168606 A1    Jun. 6, 2019

Related U.S. Application Data

(60) Provisional application No. 62/614,835, filed on Jan. 8, 2018, provisional application No. 62/595,238, filed on Dec. 6, 2017.

(51) Int. Cl.
*B60K 15/03* (2006.01)
*B64G 1/22* (2006.01)

(52) U.S. Cl.
CPC ........ *B60K 15/03006* (2013.01); *B60K 15/03* (2013.01); *B64G 1/22* (2013.01);
(Continued)

(58) Field of Classification Search
CPC .............. B60K 15/03006; B60K 15/03; B60K 2015/03171; B60K 2015/03309;
(Continued)

(56) References Cited

U.S. PATENT DOCUMENTS 3,931,834 A * 1/1976 Caillet ...................... F15B 1/14
138/30
4,451,017 A     5/1984 Marshall
(Continued)

FOREIGN PATENT DOCUMENTS

CN          201445801           5/2010
DE         102011009952         8/2012
(Continued)

OTHER PUBLICATIONS

Cubesat—California Polytechnic State University, 6U CubeSat Design Specification Revision 1.0 (CP-6UCDS-1.0) The CubeStat Program, Cal Poly SLO, accessed Feb. 2019, 27 pages.
(Continued)

*Primary Examiner* — Kareen K Thomas
(74) *Attorney, Agent, or Firm* — Perkins Coie LLP

(57) ABSTRACT

An enclosed volume is provided for performing operations in space, or on any astronomical object, in a manner separated from aspects of the external environment. The enclosed volume can be a flexible container for a satellite. The enclosed volume can include a membrane having a fluid barrier layer and being configured to contain a propellant gas or fluid; and an expulsion device configured to expel material from the membrane. In a stowed configuration, the flexible container is contained within the satellite, and in a deployed configuration, the flexible container extends away from the satellite. The flexible container can inflate from one shape, in the undeployed configuration, to another shape, in a deployed configuration. The other shape can be toroidal or
(Continued)

other appropriate shapes. The flexible container can provide bipropellant, blowdown, and gas/fluid metering functionality. Entertainment and game play can be enabled by the enclosed volume involving robots and other devices.

30 Claims, 22 Drawing Sheets

(52) U.S. Cl.
CPC ............. *B60K 2015/03085* (2013.01); *B60K 2015/03171* (2013.01); *B60K 2015/03309* (2013.01); *B60Y 2200/46* (2013.01); *B60Y 2200/50* (2013.01)

(58) Field of Classification Search
CPC ............ B60K 2015/03085; B64G 1/22; B64G 2004/005; B64G 2001/224; B64G 1/646; B64G 1/402; B60Y 2200/50; B60Y 2200/46; F17C 2227/0325; F17C 2227/0358; F17C 2203/06; F17C 2270/0186; F17C 2270/0194; B65D 2585/687
See application file for complete search history.

(56) References Cited

U.S. PATENT DOCUMENTS

| | | | |
|---|---|---|---|
| 4,728,061 A | 3/1988 | Johnson et al. | |
| 4,741,502 A * | 5/1988 | Rosen | B64G 1/007 244/158.9 |
| 4,903,919 A * | 2/1990 | Johnson | B64G 1/646 244/172.4 |
| 5,202,165 A * | 4/1993 | Lusignea | B32B 37/00 428/1.5 |
| 5,217,187 A * | 6/1993 | Criswell | B64G 1/002 244/171.3 |
| 5,427,334 A * | 6/1995 | Rauscher, Jr. | B64G 1/402 220/563 |
| 5,778,679 A * | 7/1998 | Celorier, Jr. | F15B 1/12 62/47.1 |
| 6,231,010 B1 | 5/2001 | Schneider et al. | |
| 6,264,144 B1 | 7/2001 | Thorton | |
| 6,439,508 B1 | 8/2002 | Taylor | |
| 6,514,889 B1 | 2/2003 | Theoret et al. | |
| 7,559,508 B1 | 7/2009 | Taylor et al. | |
| 7,861,884 B2 * | 1/2011 | Childress | B60K 15/03 220/560.01 |
| 9,056,676 B1 | 6/2015 | Wang | |
| 9,439,092 B1 | 9/2016 | Chukka | |
| 9,718,564 B1 | 8/2017 | Beckman | |
| 10,106,029 B2 * | 10/2018 | Aso | B60K 15/03 |
| 10,211,674 B1 | 2/2019 | Leabman | |
| 10,302,053 B2 * | 5/2019 | Aso | F02M 37/0023 |
| 10,604,281 B2 | 3/2020 | Raven | |
| 2002/0179775 A1 | 12/2002 | Turner | |
| 2004/0026571 A1 | 2/2004 | Scott | |
| 2004/0031885 A1 | 2/2004 | D'Ausilio et al. | |
| 2005/0017016 A1 * | 1/2005 | Lombari | F24D 3/1008 220/721 |
| 2007/0051854 A1 | 3/2007 | Behrens et al. | |
| 2008/0087769 A1 | 4/2008 | Johnson | |
| 2010/0006704 A1 | 1/2010 | Sainct | |
| 2012/0080438 A1 * | 4/2012 | Beretta, III | E03B 11/12 220/694 |
| 2012/0097532 A1 * | 4/2012 | DeLuze | G21B 3/006 204/278 |
| 2014/0348140 A1 | 11/2014 | Atkinson | |
| 2015/0236778 A1 | 8/2015 | Jalai | |
| 2016/0207641 A1 | 7/2016 | Myers | |
| 2016/0257432 A1 | 9/2016 | Shmueli | |
| 2016/0361992 A1 * | 12/2016 | Aso | B60K 15/03 |
| 2016/0364989 A1 | 12/2016 | Speasl et al. | |
| 2018/0093780 A1 * | 4/2018 | Melton | B64C 39/024 |
| 2019/0077523 A1 | 3/2019 | Faber | |
| 2019/0077524 A1 | 3/2019 | Faber et al. | |
| 2020/0049114 A1 * | 2/2020 | O'Connor | F02M 37/0088 |

FOREIGN PATENT DOCUMENTS

| | | |
|---|---|---|
| WO | WO-2014021741 | 2/2014 |
| WO | WO-2019051423 | 3/2019 |
| WO | WO-2019051432 | 3/2019 |

OTHER PUBLICATIONS

Cubesat—California Polytechnic State University, "CubeSat Design Specification (CDS) REV 13," The CubeStat Program, Cal Poly SLO, accessed Feb. 2019, 42 pages.
National Aeronautics and Space Administration (NASA), "CubeSat 101—Basic Concept and Processes for First Time CubeSat Developers," NASA CubeSat Launch Initiative, revision Oct. 2017, 96 pages.
ResearchGate.net, "Analysis of a hybrid genetic simulated annealing strategy applied in multi-objective optimization of orbital maneuvers," https://www.researchgate.net/figure/LEO-GTO-and-GEO-trajectories_fig10_315689898, Mar. 22, 2017, 1 page.
Valle et al., "Review of Habitable Softgoods Inflatable Design, Analysis, Testing, and Potential Space Applications," American Institute of Aeronautics and Astronautics, available at https://ntrs.nasa.gov/citations/20190000847, published: Jan. 7, 2019, 15 pages.
Inflatable Emergency Atmospheric-Entry Vehicles, Tech Briefs Engineering Solutions for Design and Manufacturing, available at: https://www.techbriefs.com/component/content/article/tb/pub/techbriefs/mechanics-and-machinery/1823, Aug. 1, 2004, 4 pages.

* cited by examiner

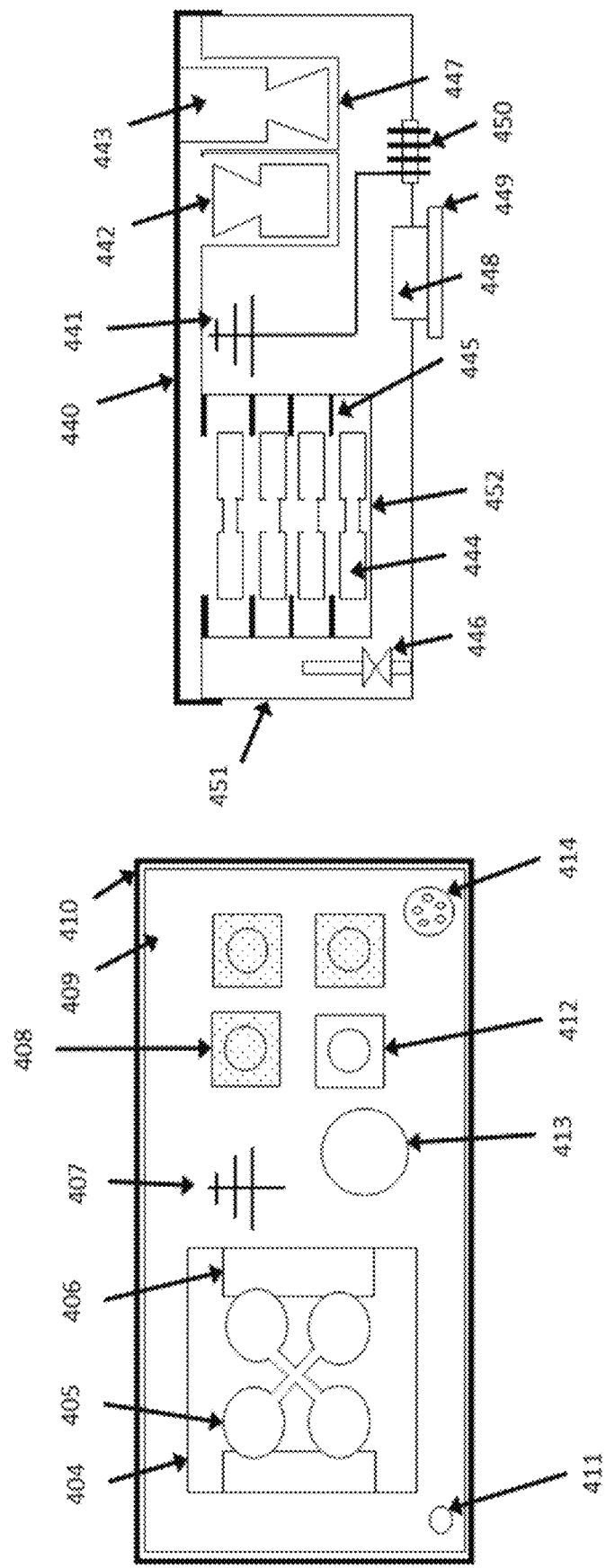

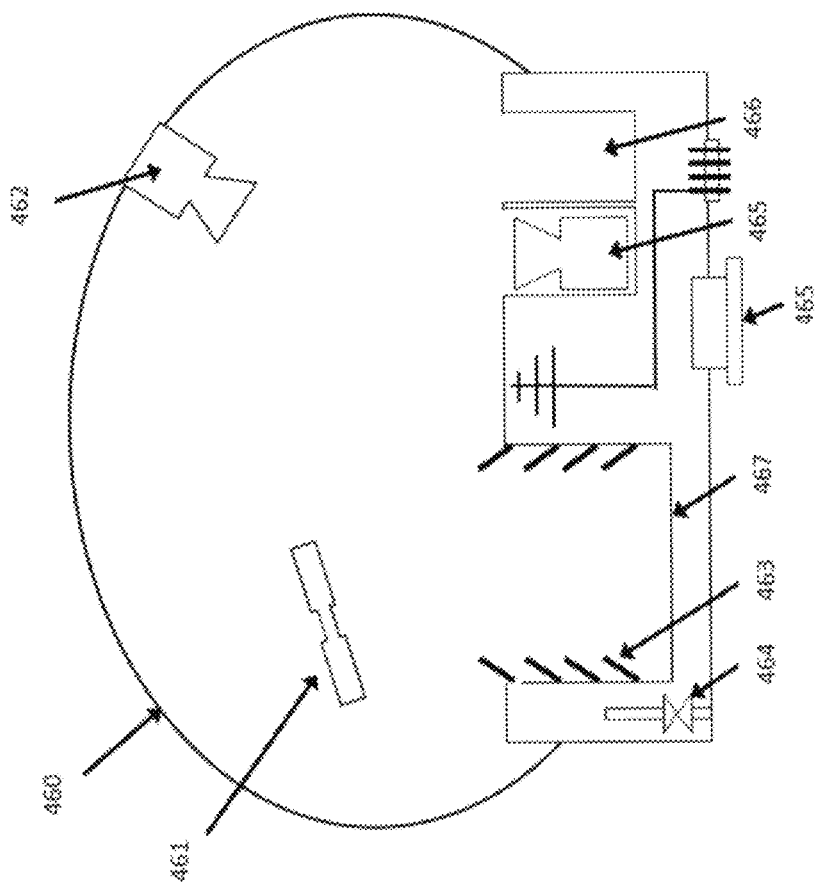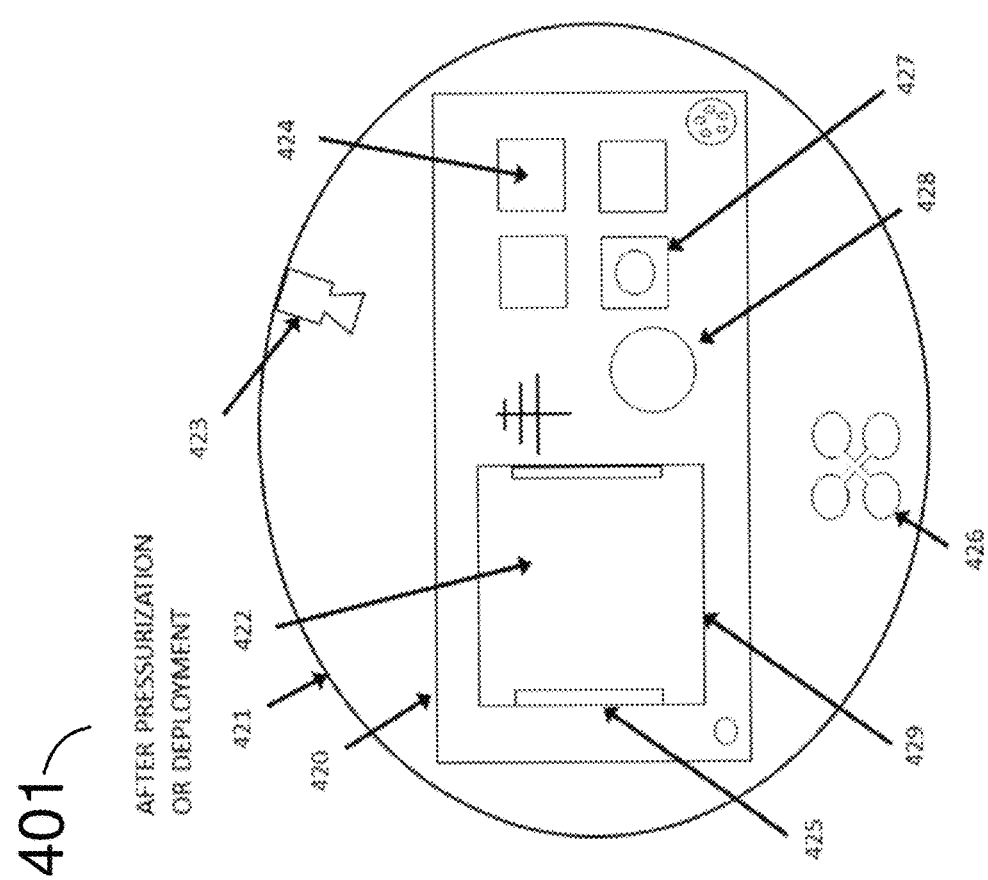

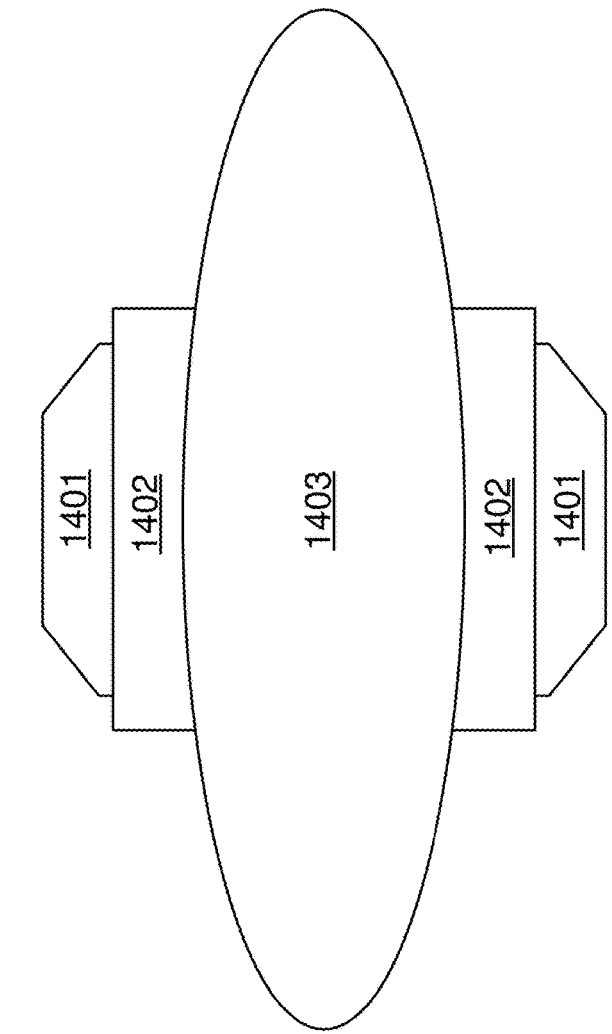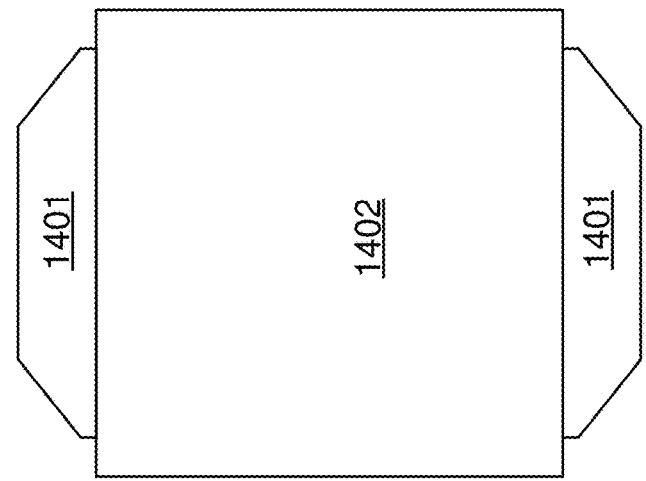
FIG. 14

SYSTEMS AND METHODS FOR CREATING AND AUTOMATING AN ENCLOSED VOLUME WITH A FLEXIBLE FUEL TANK AND PROPELLANT METERING FOR MACHINE OPERATIONS

CROSS REFERENCE TO RELATED APPLICATIONS

The present application claims the benefit of U.S. Provisional Application No. 62/595,238, filed on Dec. 6, 2017 and U.S. Provisional Application No. 62/614,835, filed on Jan. 8, 2018, both of which are incorporated in their entirety herein by reference for all purposes.

FIELD

The present technology pertains in general to enclosed volumes and more specifically, to creating and automating an enclosed volume for machine operations.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for creating and automating an enclosed volume for machine operations. The enclosed volume may be inflatable and provide a flexible container and propellant metering for use in space operations. Various embodiments provide materials compatibility for propellants and other aerospace fluids for avoiding damage to equipment or injury to personnel that may otherwise result from a leak. A compact physical spacecraft coupler may be provided that enables a physical connection (docking), fluid connection (liquid and/or gas) for fuel or oxidizer or pressurant gas, electrical power, electrical data, and combinations thereof. The flexible container can be a flexible tank that can inflate when deployed in space to various layouts including but not limited to a toroidal (or other shape with hole in the middle) or dumbbell layout. The flexible container can also provide blowdown functionality, flexibility and is designed for in-space use.

In various embodiments, the flexible container has the membrane that is multi-layered having separate functional layers including a mechanical restraint layer in addition to the barrier layer. In some embodiments, the flexible container has an inner layer that separates fuel from blowdown gas (e.g., air), and a second layer that separates air from the outside fluid/medium (e.g., air or vacuum), and a third (outside) layer made, for example of cordura, that is permeable to fluids by mechanically restrains the inner layers from expanding. This third outside layer is an outer mechanical restraint layer that may comprise a strapping, a webbing, a netting, CORDURA, or some non-porous material. The outer mechanical restraint layer may comprise a micrometeroid and orbital debris shield layer, the mechanical restraint layer being a single- or multi-layer Whipple shield configuration. The barrier layer may comprise an ethylene propylene diene monomer (EPDM) rubber.

In some embodiments, a flexible container for a host to be deployed for space operations is provided, the flexible container comprising a membrane having a fluid barrier layer and being configured to contain a propellant gas or fluid; an expulsion device configured to expel material from the membrane; the flexible container being configurable between a stowed configuration and a deployed configuration, in the stowed configuration, the flexible container being contained within the host, and in the deployed configuration, the flexible container extending away from the host; the flexible container being configured to change to the deployed configuration when the flexible container is in an extraterrestrial environment. In various embodiments, the host is a satellite, a launch vehicle, or a stage for the launch vehicle. The membrane can be inflatable and can be operational while partly inflated. In some embodiments, separate functional layers of the membrane are combined or bonded. The membrane can contain one or more volumes, each volume for holding different or similar fluids and blow down gasses, with each volume being separated by one or more layers.

In various embodiments, a flexible container system is provided that comprises one or more flexible containers each comprising an inflatable section; one or more flexible container housings, each for housing a respective one of the one or more flexible containers; and for each of the one or more flexible containers, a coupler positioned on each of opposite or adjacent sides of the respective flexible container housing, each coupler for coupling to another of the one or more flexible containers. Two or more of the flexible containers may be carried by a spacecraft or a host.

In some embodiments, a method for an enclosed volume for machine operations is provided, the method comprising providing a membrane having a barrier layer for providing separation from one of more aspects of an external environment; the membrane being configured to have devices inside the membrane, devices attached to the outside of the membrane, or devices physically separated from the membrane, the devices including at least one camera and at least one robot, the membrane being configured for wireless communication between the at least robot and a ground segment; and providing an artificial intelligence (AI) based engine including a computing environment to enable users to perform tasks related to at least some of the devices.

In some embodiments, a method (and corresponding system) are provided for coupling flexible container(s) to more than one host in space. The method may comprise: providing a flexible container having a first coupler at one end and a second coupler at another end; coupling, via the first coupler, the flexible container to a host; in response to the host maneuvering in space close to another host, coupling the second coupler to the other host; and the flexible container having a membrane configured to contain a propellant gas or fluid, such that the propellant gas or fluid is providable to both the host and the other host. Each flexible container and each coupler can be very flexible and configurable to perform this method; they can be configured, for example, such that couplers can couple flexible containers to additional hosts and to other flexible containers, providing flexible combinations and arrangements.

BRIEF DESCRIPTION OF THE DRAWINGS

Embodiments are illustrated by way of example, and not by limitation, in the figures of the accompanying drawings, in which like references indicate similar elements and in which:

FIG. 4A-FIG. 4B depicts a diagram of an example of the configuration after inflation or deployment of the volume, in accordance with various embodiments.

FIG. 4C-FIG. 4D is a diagram of an example of the configuration after inflation or deployment of the volume, in accordance with various embodiments.

FIG. 14 illustrates certain configurations of the uses of flexible container (e.g., FlexPod) at a spacecraft system level, according to various embodiments.

DETAILED DESCRIPTION

Figure 1:
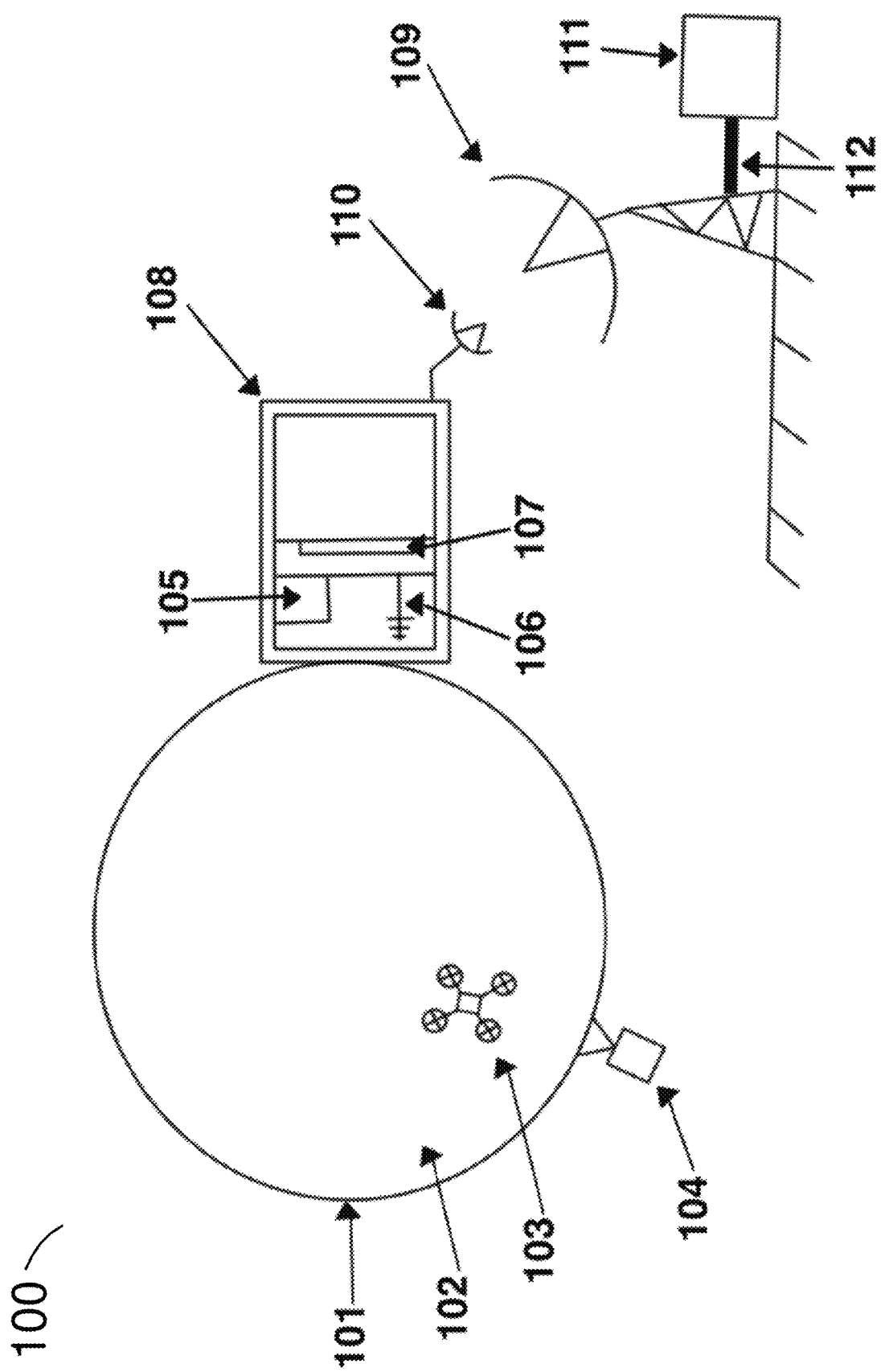
FIG. 1 is a diagram of an overview of an example of implementation described herein, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for creating and automating an enclosed volume including a flexible fuel tank and propellant metering.

An enclosed volume can provide a facility for the operation of machines, robots, drones, etc. separated from one of more aspects of the external environment by a barrier. One of the several purposes of such a facility is entertainment and gaming. The enclosed volume may be referred to as a facility and/or an arena and/or a volume. The facility may include components inside a membrane or barrier, components attached to the outside, or components physically separated from it.

The facility may relate to space and/or not space located facility. For example, the facility may be located on Earth and connect the space-related facility in any manner; and/or it may be located on various space orbits in space and connect to the space-related facility in any manner; and/or it may be located in a specific space location and connect to the space-related facility in any manner.

In some embodiments, an artificial intelligence (AI) based engine may include a computing environment that allows users to perform tasks related to disciplines, such as, but not limited to, vehicle autonomous attitude determination, pointing control, guidance, navigation, grappling, manipulation, plant control (mechanical, chemical, thermal, electrical, etc.), mining, prospecting, etc. These tasks may be performed more efficiently using the AI based engine than if the tasks were performed in another type of computing environment, such as an environment that required the user to develop code in a conventional programming language and/or parallel programming and/or computing language, such as C, Java, Pascal, etc. The AI based engine may use artificial intelligence methods (e.g., machine learning, deep learning, reinforcement learning, Q learning, to name just a few non-limiting examples) for computing mid-results and/or any results.

Various materials are expected to come into contact with propellants and aerospace fluids. The use of materials that are not compatible with the propellants and aerospace fluids may damage the equipment and cause a leak that could result in damage or injury. Various embodiments of the enclosed volume provide materials compatibility for propellants, oxidizers, and other hazardous aerospace fluids for avoiding the aforementioned damage or injury. The materials compatibility can be provided by various combinations of the inflatable volume layout, fuels, use of flexible fuel tanks and deployables/flexible tank deployment, further described herein.

Metering of propellant transfer in space is provided in some embodiments, further described herein.

Various embodiments may include a physical spacecraft coupler that enables a physical connection (docking), fluid connection (liquid and/or gas) for fuel or oxidizer or pressurant gas, electrical power, electrical data, and combinations thereof. In some embodiments, a compact coupler is provided for attachment and fluid transfer in one coupler. In some embodiments, the compact coupler is a magnetic coupler with a fluid core contained therein. The present technology is not limited to a magnetic coupling; other physical connection mechanisms may be used. Further details regarding the compact coupler are described in U.S. patent application Ser. No. 16/126,883, filed on Sep. 10, 2018, entitled "Systems and Methods for Delivering, Storing, and Processing Materials in Space" which is incorporated in its entirety herein by reference for all purposes.

FIG. 1 is a diagram of an overview of an example system, according to some embodiments. As depicted in the example in FIG. 1, an enclosed volume system 100 may include multiple elements for providing an enclosed volume for the purpose of operating various machinery. The system 100 may include a membrane 101, gas/fluid 102, a robot(s) 103, camera(s) 104, a satellite (or other) host 108, and a ground segment 109.

The membrane 101 can be configured as a balloon or a container. For space applications, the membrane 101 could be vacuum compatible including a fluorinated polyimide, e.g., CP1 Polyimide. In some embodiments, the membrane 101 can be a compatible coating on the outside of a material that is not vacuum/oxygen/ultraviolet (UV)-compatible, e.g., latex or silicon rubber. The coating may be a sprayable solvent, e.g., Essar™ Stretch 255.

The membrane 101 member can be UV stable and may have UV shielding. In some embodiments, the membrane 101 is atomic and molecular oxygen compatible. If the membrane 101 is a balloon type or otherwise pressurized (positive or negative) relative to the external environment, the membrane 101 could be able to hold internal pressure in a vacuum, at 1 atmosphere, or for testing, in various embodiments.

In some embodiments, the membrane 101 is impact resistant. The membrane 101 may be radio frequency (RF) reflective so as to create a faraday cage inside. The membrane 101 may reflect close of 100% of the frequency(s) used for wireless power. The membrane 101 can also function over various frequency ranges, for instance, it may allow transmission of some frequencies, e.g., for transmission from the robot(s) 103 to the ground segment 109. A conductive coating may be provided on the membrane and may need to be flexible. In some embodiments, conductive lines/traces are printed or otherwise attached onto the membrane 101. A (relatively) loose mesh may be provided on the outside of the membrane 101.

In various embodiments, the membrane is rupture/puncture tolerant, self-healing, and/or able to be folded/stored/compacted. Various surface finishes can be provided for the membrane 101 including smooth, reflective, and non-reflective. The membrane 101 may be re-sealable for testing purposes and can be transparent.

In some embodiments, the membrane 101 has built in sensors which may include variously sensors for pressure, temperature, stress, radiation, gas/fluid composition, condensation, humidity, impact, etc. The built in sensors may be passive, having a color change and being detectable by cameras. The built in sensors can be wireless powered or wired, digital or analog.

In some embodiments, the membrane 101 is multi-layered, having separate functional layers. A mechanical restraint (barrier) layer may include strapping, nettings, webbing, ropes, or a woven material, and can physically restrain objects from entering or leaving the volume. A fluid restraint layer may use a mechanical restraint layer for support to prevent fluid from escaping, comprising an ethylene propylene diene monomer (EPDM) rubber, for example. An RF restraint layer may confine RF at certain frequencies from escaping or entering the volume in system 100. The multi-layered aspect can include a wear layer, internal and/or external, which may reduce abrasion, cyclic stressing and fatigue of the other layers, or of the elements inside or outside the volume. In space, the multi-layer aspect may incorporate a micro-meteoroid protection layer such as a Whipple shield. The multi-layered membrane 101 can include a sensor layer incorporating the sensors mentioned above. The multi-layered membrane 101 can also incorporate data and power transmission. A visual layer of the multi-layered membrane 101 can include, for example, colored or painted, lights, artwork, textures, etc. Any two or more of the layers of the multi-layered membrane 101 may be combined.

In some embodiments, the membrane 101 may include structural elements, and be able to hold items, e.g., cameras. The structural elements of membrane 101 may be reinforced with fibers, thicker on the cylindrical ends, and/or stress equalized.

The membrane 101 in some embodiments has integral power and communications functionality. The membrane 101 can be able to handle electrostatic discharge.

Logos and other artwork may appear on the membrane 101.

Concerning manufacturability, edges or pieces may be attached together to achieve the desired three dimensional (3D) shape. The membrane 101 may be solvent-soluble such that layers can be "welded" together by dissolving the layers with solvent and re-polymerizing. Layers may also be melted together, glued or taped in some embodiments.

For manufacturability, the membrane 101 may be sprayed, painted, dipped or deposited onto a mandrill. The mandrill could be expandable, like an inflating balloon; could be sacrificial, e.g., dissolve or melt or chemically altered after making the membrane 101. The mandrill could be less than the size of the enclosed volume, requiring "inflating pressure" to reach the desired size, e.g., a balloon. During deposition, sensors may be incorporated and reinforced into the membrane 101.

Jigs may be used for assembly (taping, gluing, etc.) of the membrane 101. The membrane 101 may be testable and resettable. Debris mitigation can be provided in case of failure. The membrane 101 may have a rip-stop and may be tinted, e.g., half tinted, dark, opaque, e.g., for sun shielding.

In some embodiments, the membrane 101 can have various shapes including a sphere, cube, toroid, cylindrical (flat, spherical, torispherical or other shaped ends), or irregular. The membrane 101 may be inflatable such that it can operate while partially inflated. In various embodiments, the membrane 101 contains one or more internal volumes separated by bulkhead(s). These one or more internal volumes may be flexible or rigid.

Gas/fluid 102 can be enclosed by membrane 101. The composition of the gas/fuel may variously be inert, heavy, have no deposits if leaks, e.g., will not condense on optical elements, and can be UV stable.

In various embodiments, the gas/fuel 102 has a high molecular mass to give a high density, e.g., sulfur hexafluoride. This density provides high reaction force if used by the robotic elements as a propulsion reaction mass, e.g., propellers.

Pressure for the gas/fluid 102 can be a low operating pressure to reduce stress on the membrane and to reduce leakage rates. In various embodiments, the gas/fluid 102 is able to handle increases and decreases of pressure due to thermal effects. Pressure may be initially raised above the operating pressure to aid with deployment of the membrane 101, and then lowered by pumping the gas/fluid 102 back into the reservoir, collecting/condensing it on the getter (from where it may be released later), or by allowing it to drop slowly if/when there are any leaks.

The gas/fluid 102 can be stored variously in a solid gas generator, a pressure cartridge/cylinder, by electrolysis, or by pyrolysis. For pyrolysis, infrared (IR) or UV lamps or a filament may be provided.

The gas/fluid 102 may be releases into the volume in various ways, for example, through a diffuser and/or a filter and/or desiccant; or in a continuous stream at a constant rate, or pulsed, or dependent on the pressure of the gas storage tank.

Monitoring of temperature, pressure, composition, humidity, etc. of the gas/fluid 102 can be provided.

In various embodiments, vents are provided to allow the gas/fluid 102 to be released, for example, in case of overpressure, in case it is necessary to reduce stress on the membrane 101, or as part of a recovery procedure, e.g., if the membrane 101 fails to deploy correctly.

In some embodiments, fans are included variously for the distribution of the gas/fluid 102, for distribution of heat—cooling or heating, for movement of air through filters, and for movement of the air to contribute to the operations, e.g., as a component of gameplay, to name one example.

A filter is provided in some embodiments, variously for removing particulates, removing water (e.g., through the use of desiccants), removing chemicals that can interfere with operations, e.g., hydrocarbons, that may deposit and discolor optical surfaces.

In various embodiments, the getter deposited inside a vacuum system for the purpose of completing and maintaining the vacuum, may be a desiccant, or a cold trap. Pressurization for the membrane 101 can be done variously by slow or fast gas release, by venting, by pressure regulator/release valve; and by having the ability to partially inflate and then stop The robot 103 in system 100 in various embodiments can be wheeled, flying, or immobile (e.g., tethered or otherwise attached). The robot 103 may variously be a quadcopter drone or similar, propelled or multiple fans/propellers, an airplane—propelled by one of more propellers. Aerodynamics may produce zero or small "lift" but aids stability.

The robot 103 may be propelled by compressed air or suction. It may also be propelled by a Lorenz force. For example, the enclosed volume system 100 may have a helm-holtz coil or similar coil to create a magnetic field inside that may be relatively uniform in some embodiments. There may be a control loop between a torque rod/coil and magnetometer. The magnetometer and electromagnet may be pulsed so that the magnetometer can get a clean reading. Several coils (on booms, like the propellers of a quadcopter) may be included to create the desired torque and thrust.

The robot 103 may be propelled by electrostatic force (e.g., an electron gun/ejector charges the robot positive). The robot 103 can be able to survive for some period in a vacuum, using low outgassing materials (CVCM and TML), for example.

In various embodiments, the robot 103 is small, having a max dimension <10% of the minimum diameter of the enclosed volume.

One or more cameras may be included to record and communicate the activity of the elements inside the enclosed volume. The camera(s) may be coupled to a system that generates a 3D model of the enclosed volume and contained elements for visualization purposes, possibly in combination with other cameras mounted on other robots or objects in the volume or on the surface of the enclosed volume.

A control system may be provided for the robot 103 and may be A.I. based. The control systems can stabilize, set up starting positions, and maintain/survey area and other robots. The robot 103 may have negative thrust. In some embodiments, the quadcopter only has thrust "up".

In various embodiments, wireless communications is used for communications between robot 103 and with other elements of the system or outside the system. The wireless communication may be via Wi-Fi or other suitable means.

The robot 103 may be painted or have other surface coatings for various reasons, including to aid in identification, to be visually appealing, to create similarities with spaceships from science fiction or video games, to be "dressed up" to look like spaceships from video games, to name a few examples. Logos may also appear on the robot 103 in some embodiments.

In some embodiments, overlays may be added to the video feed for the robot 103, including logos, advertising, information, text, status markings, team colors or emblems, animated or non-animated features such as sparks, flames, tentacles, appendages, hair, etc. Markings and features can be placed on the robot 103 that are configured to aid tracking such that the overlays can be more easily and reliably inserted, e.g., QR codes, dots of a single and highly contrasting color (e.g., white), squares, concentric circles or concentric squares, etc.

Augmented reality (AR) "locators" may be provided for robot 103. The locators can be QR codes or easily recognizable features for AR tracking. In some embodiments, AR overlays are inserted on the robot 103, on the satellite or on the ground. Although various aspects may have been described with respect to the robot 103, these aspects can also apply to other robots; e.g., robot 103 can be a set or group of robots associated with the system 100.

In various embodiments, the robot 103 is configured for robustness, against radiation for example. In that example, the robot 103 can be configured for one or more of error detection and correction (EDAC) functionality, rad-tolerant circuitry, latch-up/over-current protection, fire code compliance, and periodic reset.

The robot 103 may also be configured for protection against various thermal conditions. For example, the robot 103 is configured in some embodiments to have one or more of an operating range at least 0 deg C. to +40 deg C., preferably −20 deg C. to +60 deg C., and a survival range at least −20 deg C. to +80 deg C.

Robustness can also be provided for the robot 103 against power supply outages. In some embodiments, the robot 103 can variously survive power outages that last for up to 40 minutes and can continue operating through power fluctuations and dropouts that can last up to 10 seconds.

Power reception and/or production for the robot 103 may variously be photovoltaic, e.g., from solar energy, may be wireless/beamed, and/or may be conducted from touch or bump points on the inner surface of the enclosed volume. Power management can also be provided for robot 103. For example, received power can be regulated to useful voltage levels, and power storage may be performed by supercapacitors, batteries and/or ordinary capacitors. Power point tracking may be incorporated for the robot 103, for example, "maximum power point" tracking on solar arrays, and adaptive-tuning as described in the Qi inductive power standard, to name a few.

In various embodiments, the robot 103 is configured for static discharge handling. Static charge may build up between the robot and the membrane or other elements of the system. Surfaces of the robot can be conductive with high resistance (e.g., over 1,000 Ohm, 1,000,000 Ohm preferably).

Bump protection may be provided for robot 103 in the form of bumper bars/zones of flexible materials that can absorb impact forces, e.g., foam padding, and/or shields around moving and sensitive parts, e.g., propellers, so that no part of the system can impinge on the robot 103 and cause it to fail. The protection may be metal or plastic mesh or frames and may double as RF shielding.

Stabilization is provided for the robot 103 in various embodiments. Systems for stabilizing the robot can include reaction wheels, magnetorquers (acting against the Earth's magnetic field or a local field created on or near the enclosed volume), thrusters, propellers, jets, aerodynamic features (e.g., fins, tail(s), wings), flaps and canards, to name several examples. The control systems, which may comprise an AI engine, can act to aid stabilization to provide an improved user interface/experience.

Various telemetry can be provided for the robot 103. For example, power (voltage and current may be monitored for each motor, the computer processor, the received power, the power conversion system, the power storage state, the camera(s) and the communications system), temperature (may be monitored at different points—motors, battery, CPU), position and pointing direction within the enclosed volume, and relative to other robots and elements of the system, status of all electrical systems (e.g., on/off status of various elements). In addition, a commanded state and the actual state of the robot 103 are provided in various embodiments.

In some embodiments, the telemetry may be polled every second, or every 10 seconds, for example. Different sensors may be polled at different rates. The system 100 may store all or a limited amount of the telemetry for the robot 103. For example, the system 100 may store telemetry at a different rate than it is polled, and may store it in Flash or other non-volatile memory. The methods and systems in various embodiments can have the ability for the user or system to request higher telemetry collection rates, e.g., for storage and/or communication, for some period of time, possibly indefinitely or until command otherwise, and/or starting at some point in time either immediately or in the future. Start and/or stop can be triggered by an event on the robot 103.

In various embodiments, some or all telemetry can be communicated to operators/control center/via radio link. This aspect can variously enable request download of historic telemetry data, request download of only part of the data, and prescribing which data is automatically downloaded A self-test configuration may be provided for the robot 103 which includes enabling monitoring of telemetry, comparing to thresholds or historic values, and raising alarms if there are any issues. The self-test aspect may be implemented in an AI Engine. The self-test may be performed on the robot 103, or on the computer system that is part of or in proximity to the Enclosed Volume, or at a remote location.

For the robot 103, a maneuver command sequence may be pre-positioned in the robot 103 (or trained in its AI engine), for activation on a single command or command sequence. The commands include but are not limited to spiral, flip, return to "right side up", return to "base", attack, zone defense, and inspect.

In some embodiments, the robot 103 has wheels for walking on the walls. In space, for example, the wall walking can be enabled by spinning the arena.

Lights/LEDs can be provided on the robot 103 to help see in front of the robot 103. The lights/LEDs may have a narrower beam than the cameras, to make it look like as if one is exploring through space with a flashlight. In some embodiments, the lights/LEDs may be gimballed or directional (e.g., could be achieved with multiple LEDs or lights). Another aspect of the lights/LEDs in some embodiments is to provide more visibility to other robots, and to be identifiable/differentiate between robots (e.g., color).

The robot 103 may have a scoreboard/display which can include lights to show score or health state, a countdown timer to end of game, to events (e.g., loss of communications link, movement of the arena), etc., and a screen to display of content (video, advertisements, replays, etc.). The scoreboard/display may be configured completely through overlay.

A gripper may be provided for the robot 103. In various embodiments, the gripper has no sharp edges, pinching points, etc. that could damage or cut the membrane 101. The gripper may retract fully to avoid catching on anything when not in use and can be magnetic (i.e., non-mechanical, or even non-extending).

Lasers can be provided for the robot 103. For example, the lasers may be provided for laser tag & target designation and for laser detectors so the system knows when there has been a hit.

In various embodiments, the robot 103 is configured for fire code and bootloader functionality. The "fire code" may provide the ability to send a command to the robot 103 to do a hard power reset. The fire code bypasses the onboard computing functions to allow recovery of a latched computer or communications bus. Implementation of the fire code may be by a DTMF tone decoder or similar. The "bootloader" functionality may include firmware that allows the loading of application code. Functions for the bootloader may be limited variously to executing application software (possibly choosing between different versions or applications), uploading new or revised application code, and/or poking the data bus—sending and receiving raw data-bus packets.

Thermal control can be provided for the robot 103 in some embodiments. The robot 103 can be air cooled, and conductive paths e.g., copper traces or braid, can be provided to assist in extracting heat from relevant regions. Cooling fins may be used to increase heat transfer to the surrounding air.

The robot 103 may act as obstacles, or be designed specifically to be obstacles e.g., to enhance gameplay. For example, the robot 103 may have limited movement capability, possibly none, could be an NPC robot with maneuverability, cameras, etc. The shape and color of the robot 103 may be configured to fit gameplay e.g., look like asteroids.

The robot 103 can include low outgassing materials and otherwise not have materials that might fog the cameras. In some embodiments, deployable parts are provided for the robot 103 including for example, protective covers, antennas, and nothing that can catch undesirably on another object.

The camera 104 (or cameras 104 since camera 104 may be one or more) may be provided at various locations. For example, the camera 104 can variously be mounted on the membrane, and can be deployed (e.g., on a boom or similar means to stand it off from the satellite and position it correctly). A movable mechanism/boom may be provided to change camera angles.

In various embodiments, the camera 104 can be external and/or internal to the membrane/enclosed volume, can be attached to floating obstacles, and can be fixed to the satellite body. The camera 104 can communicate by wireless (Wi-Fi) or wired data connection and may obtain power from the wireless or wired power connections. Resolution for the camera 104 could be high definition e.g., 1080p and 3D capability is provided in some embodiments. The camera 104 may comprise stereo cameras and may combine the images to produce a 3D image/experience.

Overlays can be added to the robot 103, the arena and the obstacles (as further described above).

Image/Video Compression can be provided for the camera 104. It may be streaming compression, can be lossless or lossy, and may provide MPG4 functionality. In addition, the camera 104 can have various wavelength response, for example thermal IR, near IR, visible, or other bands of interest. Furthermore, hot pixel adjustment for the camera 104 may be provided in software.

The camera 104 may have radiation shielding, e.g., a layer of tantalum on the back side of the chips or around the camera electronics/sensor, baffles to avoid sun glare, and stray light compensation in software. The camera 104 can be an eagle-eye camera and may be configured to operate on a stick, boom, etc., on a companion satellite, and may have a fisheye lens.

Lights and related functionality may be provided for the camera 104. For example, to avoid blinding (e.g., smart software may dim lights when they are pointing at a camera 104). The lights for the camera 104 may support various wavelengths/bands including infrared, visible, and/or color, e.g., RGB, RGBW.

A programmable intensity, band can be provided for the camera 104 in some embodiments. This may operate individually or in sets, and can be an array, e.g., a display.

The camera 104 may have wireless power and data/control functionality for example, RF, audio tone control, control by vibration in walls. This functionality may be built into walls. The camera 104 can have microphones to pick up vibrations and sounds.

Power 105 in the example in FIG. 1 can be provided through various connection means. For example, a wireless power system, bump/contact power, charge terminals (which may have magnetic attach/release). In some embodiments, power transfer between robots is provided.

Communications 106 for the satellite host 108 can variously include for example, a Wi-Fi inside membrane (e.g., non-resonant with size of enclosed volume), audio backup Telemetry, tracking, and command (TT&C) e.g., used for communication between spacecraft and the ground systems). Communications may have a low rate backup TT&C.

Multiple channels may be used for communication. For example, a separate, different band can be used for each device (robots, cameras, debug, etc.). A Wi-Fi outside membrane may be used for communication, e.g., for external cameras.

In various embodiments, communications avoid interference with beamed power. For example, the system 100 may choose a frequency and RF system (Rx, mod/demod, amplifiers, filters, etc.) that have their nulls in the bands. Frequency hopping and/or spread spectrum communication may be provided.

Flashing LEDs may be included for diagnostic/debug of communications. The flashing LEDs may be visible to cameras on the arena.

A computer system 107, including software, may be in proximity to the enclosed volume. e.g., the satellite host 108 in FIG. 1. The computer system 107 can provide video enhancements and image improvement for video and images from the camera(s) 104. In some embodiments, the image improvement includes one or more of rectification, "rubber sheet" geometric correction, hot pixel removal, stray light removal, overlays in the feed, and image recognition for targeting. The computer system 107 can also provide compression of data as needed.

In various embodiments, the computer system 107 includes Attitude Determination and Control System (ADCS)/Guidance, Navigation & Control (GNC) support functions variously for stability, right-side-up attitude, and to communicate position/direction knowledge.

The computer system 107 can provide computing resources for autonomy, telemetry, self-check/diagnostic, inbuilt maneuvering, and the bootloader. Protective cutoffs can be included to protect the computer system 107 in regard to thermal, power, latch-up/over-current, and watch-dog functionality.

In some embodiments, a periodic reset is provided for the computer system 107. Error detection and correction (EDAC) may also be provided along with reset counters (and record the reason for the reset if possible). The application program interfaces (APIs) for the computer system 107 may be published.

The host 108 may be a satellite, a launch vehicle or a stage of the launch vehicle. In some embodiments, a CubeSat (deployed from a dispenser), may be one or more satellites joined together, and/or may stay attached to the rocket upper-stage and operate there. In some embodiments, if satellite host 108 is a CubeSat, everything (including power generation) needs to deploy from the small end. A solar array may shade the enclosed volume from the sun (or other light sources), for improving lighting or creating interesting gameplay. Logos, artwork, names, etc. may be painted/etched/stuck/etc. onto the body of the satellite host 108.

ADCS/GNC can be supported by the satellite host 108 to variously move the arena to create game-play features, count-down to "tilt", and rotate the arena to create pseudo-gravity, to make things stick to the walls.

In some embodiments, appendages are visible from inside the arena to provide a cool, stylish look, e.g., like a ring world, like in HALO, and may move or be reconfigurable.

For the satellite host 108, sharp edges or appendages that could damage the membrane 101 may be reduced, e.g., for anything outside the "slop radius" of a deflated or partially-inflated, ideally for all edges and surfaces. In some embodiments, the design of the satellite host 108 covers the edges with tape, foam, molded or rounded attachments made from spongy material, and all fasteners are counter-sunk to be sure to lock them in place so they cannot loosen and become catch-points.

The ground segment 109 can be able to receive data from the satellite and transmit data to the satellite, for example, a range of frequencies possibly, including optical, Ka band, X band, S band, UHF and VHF; a range of modulations schemes possible, a range of antenna configurations possible, and may be asymmetric—more data coming down than going up.

In various embodiments, the ground segment 109 can variously be distributed to maximize availability; relayed by satellite with multiple ground stations in different locations; match the Tx and Rx frequencies of the satellite the satellite host 108; may be able to receive signals directly from the robot(s) 103, e.g., if the robot Tx frequency can escape from the enclosed volume. An antenna 110 can be included in ground segment 109 for communications with the ground.

The system 100 also may include a production center 111 for various post-production, e.g., adding overlays, AR elements, etc., selecting between the camera view for broadcasting, inserting commercial breaks, generating 3D visualizations, and distribution to consumers (mobile, web download or streaming, cable network, over the top (OTT), pay per view (PPV), etc.)

The ground segment 109 can include ground network connections 112 to various provide Internet, dedicated lines, and wireless functionality.

Game play can be provided by system 100 in various embodiments. The membrane 101 may be inhibited from opening/operating until a skilled "pilot" uses a robot to release something which, for example, could be portrayed as a design or manufacturing failure, could be a regularly occurring event, with awards and commendation made to the pilot who successfully "recovers" or "enables" the arena.

Game play can variously include tag, first person shooter using laser tag, ramming/bumper car, push/bump/propel an object (e.g., ball) into a volume (e.g., end-zone) or through an area (e.g., net or goal), or move the robot 103 into that position, "king of the hill"—maintain a position/try to remove another player from that position, and capture the flag.

In various embodiments, all the parts in system 100 can interact.

Figure 2:
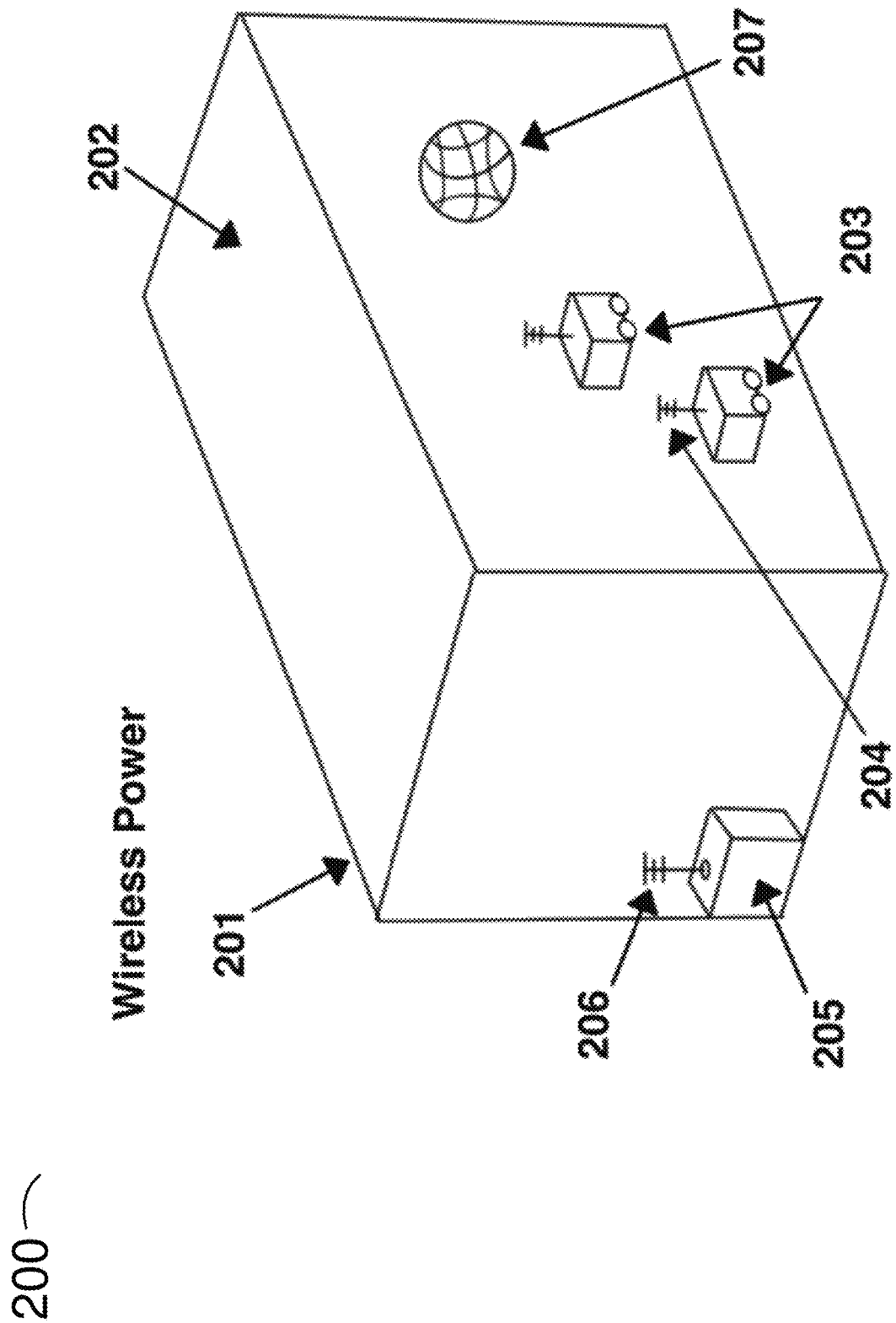
FIG. 2 is a diagram of an example of a wireless power system, according to various embodiments.

FIG. 2 is a diagram of an example of a wireless power system 200 for the system in FIG. 1, according to various embodiments. As depicted in FIG. 2, the wireless power system 200 for the enclosed volume system 100 may include 'multiple elements including: RF reflective 201; gas, fluid and particles 202 inside the volume; receiving systems 203; antenna 204 on the receiving system; 205 identifies power management, RF generation/amplification, and transmitter; transmit antenna 206; and objects 207 inside the volume that are not active.

The wireless power system 200 can flood the space with RF, like a microwave oven, avoiding resonance or "null spots" inside the volume and operating even if the volume is partially or incorrectly deployed. The wireless power system 200 may also only irradiate an area or part of the arena, rather than the whole arena, e.g., a location being activated, using the arena (or part of it) as a resonant cavity.

In some embodiments, the wireless power system 200 is directed/beamed, may avoid inter-mod, provide IR, microwave, optical, have multiple antennas, e.g., on Tx and on robot (Rx), and a smart system (which may have AI) to balance the Tx between the antennas (amplitude and phase) to ensure reception and avoid lockages/shadowing.

The antenna configuration for the wireless power system 200 can variously be dipole or patch. The wireless power system 200 may modulate for data, e.g., using amplitude modulation (AM), frequency modulation (FM), pulse modulation (PM), or on-Off Keying e.g., Morse code, or combinations thereof. The wireless power system 200 may have be able to turn off the power RX for a device (robot 103, camera 103, etc.), so that the device stops absorbing the wireless power and the reduced number of device have more power each so they can keep operating if there is insufficient power.

In some embodiments, the wireless power system 200 includes an Rx antenna on the satellite host 108 for self-test/feedback where more than one can inform power homogeneity.

The RF reflective element 201 can create a Faraday cage inside the wireless power system 200; may reflect close of 100% of the frequency(s) used for wireless power; may operate at various frequency range; may allow transmission of some frequencies e.g., for transmission from the robot(s) 103 to the ground segment 109. In some embodiments, the RF reflective element 201 can include a conductive coating on the membrane (may need to be flexible), conductive lines/traces printed/stuck onto the membrane, and/or a (relatively) lose mesh on the outside of the membrane.

In various embodiments, the gas, fluid and particles 202 inside the volume must not interfere, absorb or reflect the power signal, e.g., low humidity, no metal vapors or carbon compounds that absorb, for instance, the ISM band RF.

In various embodiments, 203 in FIG. 2 identifies various receiving systems that: need power, e.g., robot(s) 103, drones, rovers, robotic systems, sensors, actuators, communications elements, etc.; may be flying, crawling and/or fixed; may include multiple devices; and may have monitoring, signaling and communicating systems (sensors, cameras, lights (LED, fluorescent, etc.), fans, compressors, blowers, valves, Wi-Fi routers/boosters, transmitters, receivers, speakers, microphones, etc.); may be distributed or connected; and may use wireless power as primary or backup.

The antenna 204 on the receiving system 203 may be omnidirectional, typically semi-hemispherical; patch or whip; directional, e.g., tracking or rotating); and/or multiple antennas, for redundancy and avoidance of possible "nulls"

In the example in FIG. 1, element 205 provide the power management, RF generation/amplification, and transmitter. The transmit antenna 206 can be provided with element 206.

In some embodiments, the transmit antenna 206 may be: able to handle multiple frequencies with one or more antennas, where each antenna may handle a different range; multiple antennas for redundancy, directionality, or to reduce power load on a single antenna; programmable or automatically (e.g., using AI) adjusted to maximize power transfer to the receiving systems 203; omni-directional to flood the volume with RF evenly; dipole, patch, slot, monopole, etc.; and/or flat (patch or similar) to reduce profile/volume.

The transmit antenna 206 can: provide directionality by phased array (phase-adjusted amplifiers, meta materials, etc.), or be a gimballed dish/yagi/directional antenna; be positioned to flood the volume with RF evenly; may create nulls in places that don't need to receive power, or want to avoid power being received by systems entering that volume; and/or be deployable after launch/transport.

The objects 207 inside the volume that are not active may be: movable (i.e., not attached to any surface or other object) or non-movable; designed to not interfere with the power transmission, wherever they may be; may be RF transparent; may have RF pick-up to power sensors, lights, transmitters, etc.; may be components/obstacles of a game; may carry advertising, logos, etc.; and/or may represent characters or objects from pop culture, books, movies, computer games, etc.

Figure 3:
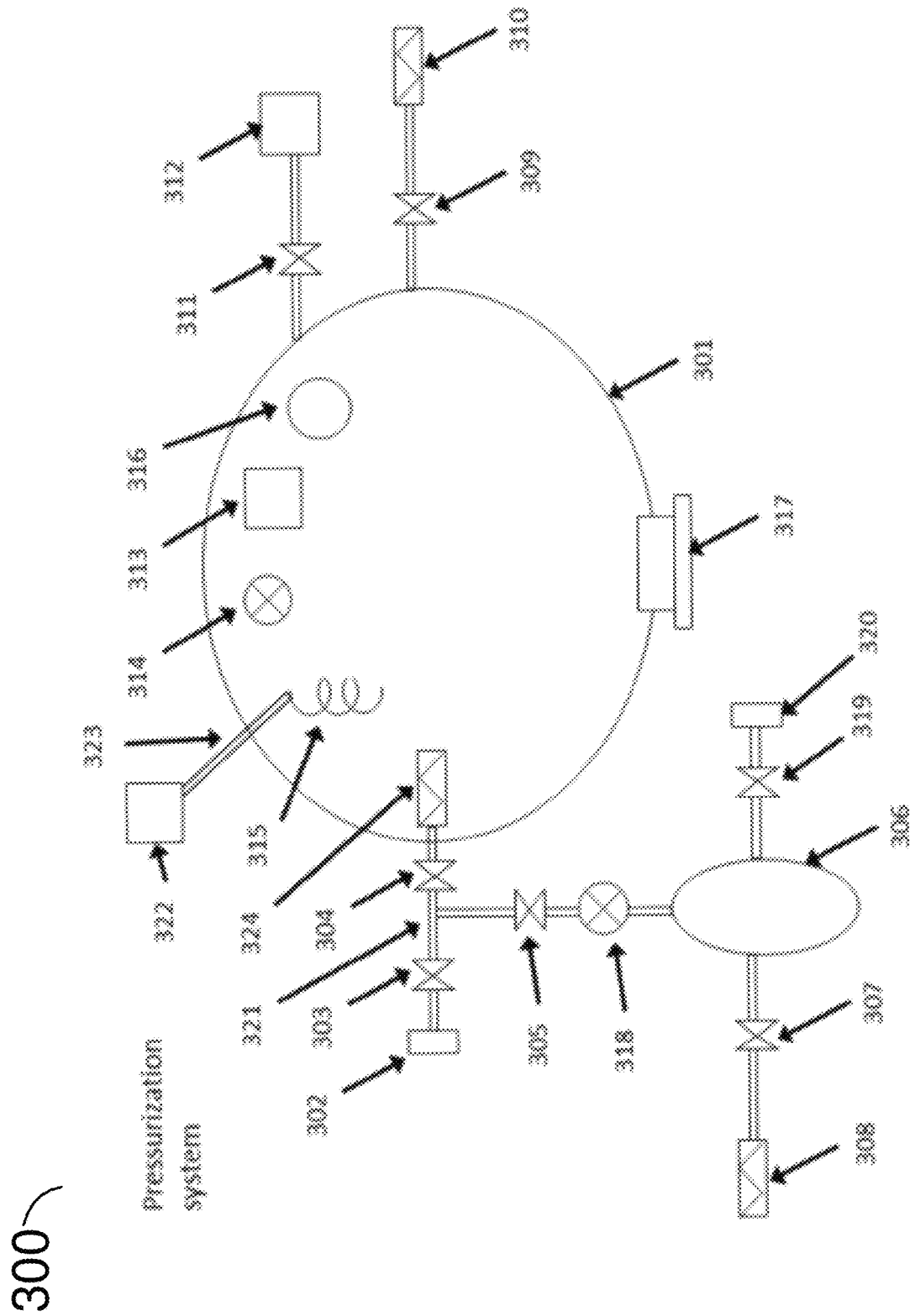
FIG. 3 is a diagram of an example of the pressurization system, according to some embodiments.

FIG. 3 is a diagram of an example of the pressurization system 300, in accordance with some embodiments. As depicted in FIG. 3, the enclosed volume may be pressurized, with the pressurization system may include a pressurization system 300, a membrane 301, an end cap or interface 302, various valves 303, 304, and 305

The membrane 301 may be surrounding an enclosed volume; elastic, like a balloon; opaque, transparent, translucent; partially opaque e.g., on hemisphere that is used as a sun shade; and/or similar to elements 101, 201, 401, 440, 412, and 460.

In the example embodiment in FIG. 3, valve 303 is on the supply line, valve 304 is on the enclosed volume entry line, and valve 305 is on the reservoir entry line.

The pressurization system 300 may include a fluid supply and/or reservoir 306 which in various embodiments is expected to be air or gas; during launch the pressure chamber is at the pressure of the surrounding environments, that being 1 bar at launch and vacuum when it reaches space; in space the valves are closed to isolate the chamber from the local pressure environment which can allow the pressure to be increased by filling the chamber with gas or fluid from this reservoir.

The fluid supply and/or reservoir 306 may include a high pressure gas (pressure cylinder), a liquid which transitions to a gas when pressure is reduced, a solid gas generator, electrolysis or similar unit for creating gas from a solid or liquid, a pyrolysis, IR or UV lamps, and/or a filament. The fluid supply and/or reservoir 306 may be adorned with sensors for pressure, temperature, composition, gas/liquid/solid fraction, etc., and may incorporate a heater, stirrer, etc.

A reservoir pressure relief valve 307 may be on the pressure relief line or on any of the other lines connected to the reservoir, and in various embodiments, it must be on the reservoir side of any valves. Diffusers 308 and 310 may also be included.

In some embodiments, a pressure relief valve 309 is included, which may be on the pressure relief line or on any of the other lines connected to the reservoir; and in various embodiments, the pressure relief valve 309 must be on the reservoir side of any valves.

A getter valve 311 can be included and may be one-use type, sealing into the getter any materials that are deposited/absorbed on the getter. In various embodiments, getter 312 outside the enclosed volume is included and may be thermal/cold/cryogenic with various cooling mechanisms, with connection to radiators. The getter 312 may be chemical, a chelator, ligand, or form clathrates.

The pressurization system 300 may also include a getter 313 inside the enclosed volume; a fan 314 inside the enclosed volume where air circulation aids thermal distribution; and/or a heating element 315 inside the enclosed volume.

Sensors 316, which can be one or more sensors, may be included inside the enclosed volume for monitoring the pressurization fluid for pressure, temperature, humidity, RF, magnetic, electro-static, fluid composition, light levels, air currents, etc. The sensors 316 are preferably mounted on the walls of the enclosed volume or on the tubes entering the volume; provide inputs to a control system 322. The sensors 315 may also be located on the reservoir 306, the piping 321, the getters 312 and 313, the access port 317 or other locations on the system. External sensors may also be used to determine the external environment.

Access port 317 may be provided and can be the same as element 413 in FIG. 4A.

Pumps 318 can be included in the pressurization system 300, the pumps 318 may be reversible; and may be on the air inlet, or on the reservoir inlet/outlet or on the enclosed volume inlet/outlet.

The valve 319 may be the same as valve 303, but be located directly off the reservoir. The pressurization system 300 may include an end cap 319 that is the same as end cap 302, but be located directly off the reservoir. An air-tight pipe or tube 320, with junctions as appropriate, can be included. The air-tight pipe or tube 320 can be metal or plastic, of a low outgassing material, or coated.

A control system 322 for heater 315, fans 314, getter 313 and sensors 316 can be include and be located inside or outside the enclosed volume. A connection 323 can be between the control system 322 and the control or sensor elements 315, 313, 314, 316 or any other elements inside the enclosed volume. In FIG. 3, for clarity, only the connection to the heater 315 is shown. The connection 323 may be a wired or wireless or some combination, flexible or rigid or some combination.

A diffuser 324 may be located on the gas/fluid entry line into the enclosed volume, through which gas can flow to enter the enclosed volume. In some embodiments, diffusing the incoming air reduces stress on the membrane 101, reduces acoustic loading (e.g., sound levels), distributes and reduces thermal loads (e.g., cooling effects of expanding gasses), etc. The diffuser 324 may be heated; may be recessed into the wall of the volume or chamber to avoid obstructing the activities inside the volume; may be redundant e.g., multiple entry lines; may direct airflow to assist in ejection of other elements of system during deployment including robots 405, cameras 408 and the stowed membrane 410; and may be a jet rather than a diffuser, to create high velocity air currents.

All of the parts mentioned regarding FIG. 3 may interact.

FIG. 4A-4B depicts a diagram of an example of the configuration after inflation or deployment of the volume, in accordance with various embodiments. FIG. 4C-D is a diagram of an example of the configuration after inflation or deployment of the volume, in accordance with various embodiments. As depicted in FIG. 4 A-D, the enclosed volume and its contained elements may be deployed from a compact, stowed configuration. The four FIGS. 4A, 4B, 4C and 4D) are diagrams showing a possible implementation of this system as part of a CubeSat, highlighting how various elements interface with the enclosed volume (which may also be called a pressurized volume), which may be a pressure chamber. In some embodiments, the items that must be inside the enclosed volume, pass through wall of the enclosed volume, or attach to the wall of the enclosed volume.

In FIG. 4A, a deployable enclosed volume configuration 400 is shown from above, before deployment or inflation. FIG. 4C shows the deployable enclosed volume configuration 401 from above, after deployment or inflation. FIG. 4C shows a configuration 402 where the deployable enclosed volume is shown from the side, before deployment or inflation. In FIG. 4D, a deployable enclosed volume is shown from the side, after deployment or inflation, in configuration 403.

In FIG. 4A the deployable enclosed volume include multiple elements: robot holder 404 which may hold the robot 103 during launch phase and possibly longer; robots may be deployed all at once, in a timed sequence, on command, or in an event-driven manner; and there may be multiple holders for multiple robots, or many robots in one holder. Robots 405 (as 103) are shown stowed in the holder 404. A robot restraining/release device 406 may be included and may be a flap, latch, screw, burn-wire, pin puller, bolt cutter, or tie-down strap; may hold robots down separately, or a single hold-down may secure all of them together; may incorporate one or more springs or pusher plates to assist the robotic elements (405 is referred to herein as robot, robot(s), robotic element, or robotic elements and may refer to one or more of these) to deploy once released; may use the air escaping from the gas entry line 324 to assist the robotic elements 405 to deploy once released; and may be resettable.

An antenna 407 can be provide for wireless power and/or communications and may be: tuned to the frequency of the transmission; connected to a feedthrough 450 that allows the RF to come from external sources and be delivered to external receivers; may be multi-frequency in one antenna, or may be multiple antennas; multiple antennas providing better isolation between power transmission frequencies and data communications frequencies; may incorporate RF balance, ballast or other frequency tuning, resonating and filtering elements; may incorporate directionality and beam steering by means of geometry, mechanical or electrical (phased array) systems; and/or may be made of metal, conductive plastic, carbon fiber, or other conductive material.

Cameras 408 may be attached to a pressure membrane, in camera holder: while stowed, the camera may pointing into the pressure chamber plate 409 such that the "rear" end can be attached to the membrane (shown more clearly as 443); may be restrained by means similar to those restraining the robotic elements (e.g., 406), with similar means to aid deployment such as springs etc.; pressure chamber plate 409 may act as a dust cover or protective device during handling, assembly, etc.; and camera optical elements could have means to vent gas in case the must pass through a vacuum for some period.

A pressure chamber plate 409 may be provided and may be a solid (metal, ceramic, plastic and may be 3D printed) piece (or pieces) that houses all the equipment that contacts the enclosed volume (note that the "enclosed volume" may also be called the "pressurized section" or "pressure chamber"); provides mechanical interface to surrounding equipment e.g., a satellite. The pressure chamber plate 409 may be sized to fit a CubeSat 1 U, 3 U side, 6 U end, 12 U side, or 12 U end; may have rounded edges wherever it may contact the membrane 410, so as not to damage it; may incorporate or interface to holding and/or deploying devices for robots (as per 404), cameras (as per 447), antennas, access ports, feed throughs, air inlets, the folded membrane and other elements that contact or are contained inside the enclosed volume after deployment.

A pressure chamber membrane 410, as per 101, can be folded down before inflation; may be resettable; may be elastic; may have tie-down points incorporated into it to aid stowage and deployment; may be folded up on itself in some type of origami, or just "scrunched up"; may be folded into a holder of recess in the pressure chamber plate 409 similar to 404; and may be held down with a restraining/release device similar manner to 406, or by a cap or cover, or be restrained by an external container, e.g., a CubeSat deployer or PPOD.

An air inlet, entry line 411 is included into the enclosed volume, may have a diffuser as described in 324, and may be attached to plumbing as described in FIG. 3.

Cameras 412 attached to the pressure chamber plate or satellite body that does not deploy with the membrane; it may remain fixed on the body; and may be deployed into the pressure chamber by another means e.g., a boom.

In the example in FIG. 4A, an access port(s) 413 is included and provides access for equipment, materials, humans, human appendage (fingers, hands, arms, heads, etc.), robots, sensors/probes, cameras, wires, connectors, etc. to pass from inside the enclosed volume to outside the enclosed volume, and vice versa, and also to be partially inside and partially outside the enclosed volume. The access port(s) 413 can be opened and closed, manually or by a mechanism; the close/open mechanism may be pneumatic, electric, magnetic, mechanical, etc.; may have a back-up mechanical opening mechanism to allow opening by hand; a mechanism control system may restrict opening when the external and internal pressures are not equal; and an access port, pressure chamber plate, membrane or other system may incorporate a means to equalize pressure between inside and outside. The pressure equalization mechanism may be a one-way valve or pressure regulator that allows fluid to flow from outside to inside, may be bi-directional, and when open, may allow for inserting and removing objects, e.g., robots, cameras, etc., and doing tests, repairs, etc. after the membrane 101 has been attached/sealed.

A feedthrough 414 can be provided which is configured for data, power, RF, thermal, fluid; sealed to stop leaks of fluid from the pressurized volume (except through tubes); terminates on each side in a connector or fly wires; may be more than one so that they are isolated from each other to minimize influence of one on the other; may be removable/replaceable e.g., as a threaded insert; and may have a cover or dust cap attached during assembly to protect it from mechanical damage or contamination.

In FIG. 4C, the deployable enclosed volume includes multiple elements: pressure chamber plate 420 (as per 409), pressure chamber membrane (as per 410) in deployed configuration; may be rigid (i.e., not require deployment of inflation) or flexible (requiring deployment or inflation); and/or may be deployed after satellite launch or shipping to operational location. A robot holder 422 (as per 404) is provided for operation after deployment of robot(s) 103.

A camera 423 may be mounted to pressure membrane (as per 408), after deployment from the camera holder 424 (as per 447) after deployment of cameras. A robot restraining device 425 (as per 4061) after robot 426 has been deployed, may be included where nothing extending in a way that might catch on a robotic or other element, e.g., rope, string, wire, hooks, loops; the robotic element preferably retracted into recessed areas.

Configuration 401 can include a robot 426 (same as 103) after deployment into enclosed volume; and cameras 427 attached to pressure chamber plate (as per 412) where this camera does not deploy with the membrane.

In some embodiments, an access port 428 (as per 413) is included when enclosed volume has been deployed and may be: sealed to prevent leakage of contained fluid/gas; may be able to open whilst pressurized, equalizing the pressure during release; may connect to an access port on another space system (i.e. a docking port); may provide docking capability e.g., mechanical attachment between two independent spacecraft that launch together or rendezvous in Earth orbit, carrying force, torque, pressure, thermal and/or vibration loads; may be androgynous, or male/female; may be "keyed" such that only select systems can mate to the port.

When "docked", air leakage for the access port 428 may be minimized by seals including: O-rings (silicone, rubber, etc.), and/or gaskets (metal, silicone, rubber, etc.); and when "docked", may provide connections for data, power, fluids, thermal, etc.

The robot holder 429 (same as 404) may be used after robot 426 has been deployed where nothing extending in a way that might catch on a robotic or other element, e.g., rope, string, wire, hooks, loops, flaps, and no pinch points; and may have a cover that slides into place to ensure that nothing can get trapped or stuck.

In various embodiments, FIG. 4B shows the same configuration as FIG. 4A, but from the side so as to reveal more details. Some of the elements comprising the configuration are shown in more detail in FIG. 4B including: a pressure chamber membrane 440, folded down before inflation (same as 410); an antenna 441 for wireless power and/or communications (same as 407); an RF connection through a feedthrough 450 in the pressure chamber plate 451. In some embodiments, it is possible for the RF antenna(s) to be outside the pressure layer of the membrane, but inside any RF reflective layers.

Cameras 442 may be attached to the pressure chamber plate (same as 412). This camera 442 does not deploy with the membrane. Cameras 443 may be attached to the pressure membrane, in the camera holder (same as 408).

Robots in holder 444 (same as 405) may be provided and may be stacked inside the robot holder. A robot restraining device 445 (same as 406) can also be provided and may be retracted, covered, folded out of the way or positioned such that they cannot present hazards to the operation of the robotic elements after deployment.

Valves 446 on air inlet 411 can be included and may be part of plumbing as described in FIG. 3; may be multiple valves, diffusers, and other fluid management devices, as shown in FIG. 3. The valves 446 can have a vent value being open during launch, then closed once in orbit and deployed from the launch vehicle; a pressurization value closed during launch, then opened to allow gas to flow into the pressure chamber; a pressure Relief Value, that will vent gas if the internal pressure passes the safety threshold.

A camera holder 447 may be included and may holds the camera elements and lights 104 during launch phase and possibly longer. The cameras may be deployed all at once, in a timed sequence, on command, or in an event-driven manner. The cameras may be held in separate holders (as shown) or stacked similar to the robotic elements depicted in 444; may be multiple holders for multiple cameras, or many cameras in one holder; and may have a restraining/release device for cameras may be similar means to those for robotic elements as described in 406 and 445.

The configuration 402 (which may also be referred to as a view) may include access port(s) 448, see also 413. A door, cap, lid, or plug on access port 409, see also 413, may be included, as well as a feedthrough 450, see 414.

A pressure chamber plate 451 in FIG. 4B is akin to 409 and may hold and seal the membrane 301, possibly by the following means: mechanical clamping force, e.g., a clamp band, hose clamp, cable tie, etc.; glue or chemical adhesion; welding, brazing (e.g., thermally or chemically); utilizing the elastic properties of the membrane; O-rings (or using the elastic properties of the membrane to act as an O-ring); a screw-down seal or gasket; some other means of sealing; or using the pressure chamber plate as a mandrel, or part of a mandrel with a sacrificial or removable component, or combinations thereof. The mandrel thus formed can be dipped, painted or otherwise coated in the membrane fluid barrier material. In some embodiments, a robot holder 452 may be included (same as 404).

FIG. 4D shows the same configuration as FIG. 4C, but from the side so as to reveal more details. Some of the elements shown in more detail in FIG. 4D are: a pressure chamber membrane 460, after deployment (same as 421); a robotic element after deployment into enclosed volume (same as 426); a camera 462 mounted to membrane (same as 423), after deployment from a camera holder 466; robot restraining device 463 after robot deployment (same as 425); valves on air inlet (only one is shown for simplicity) (same as 446); cameras 465 attached to pressure chamber plate (same as 427, 442 and 408) where cameras 465 does not deploy with the membrane. FIG. 4D also shows the empty camera holder 466 (same as 424), robot holder 467 for drones, robots, rovers, free-fliers, etc. (same as 429), according to an example embodiment.

Figure 5:
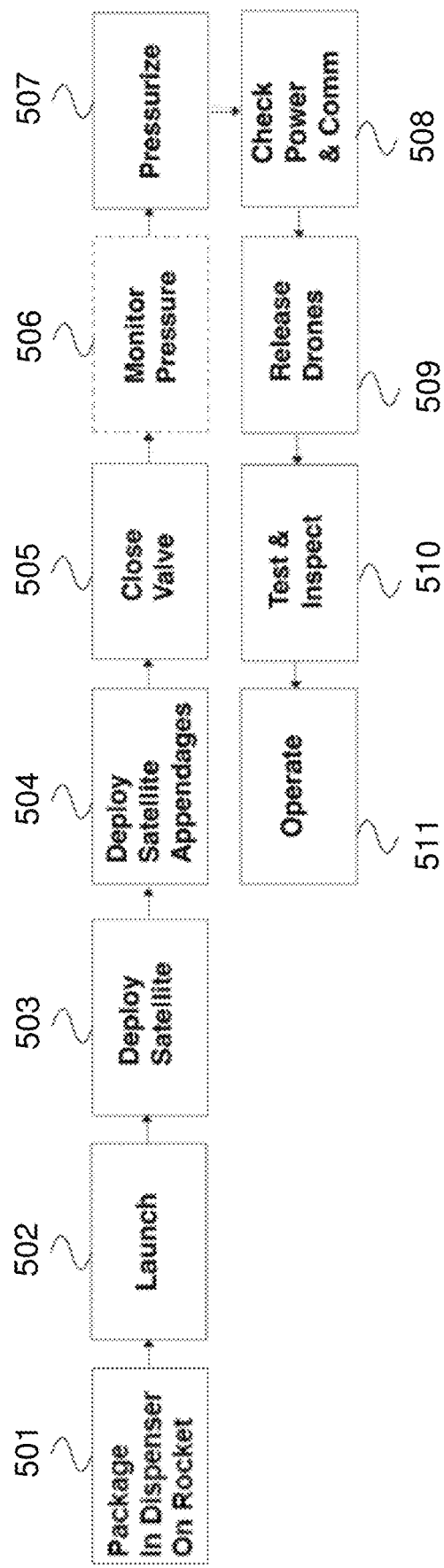
FIG. 5 illustrates a flow chart of an example launch process for launching and preparing an enclosed volume in space.

FIG. 5 illustrates a flow chart of an example launch process 500 for launching and preparing an enclosed volume in space. In the example in FIG. 5, step 501 is package in dispenser on rocket, then launched in step 502. Step 503 includes deploying the satellite, and then step 504 includes deploying the satellite appendages. In step 505, the valve is closed then pressure is monitored in step 506. Step 507 includes pressurization. In step 508, power and communication are checked. In step 509, drones are released. Then, test and inspect occurs in step 510. In the last step in FIG. 5, the operation proceeds.

Figure 6:
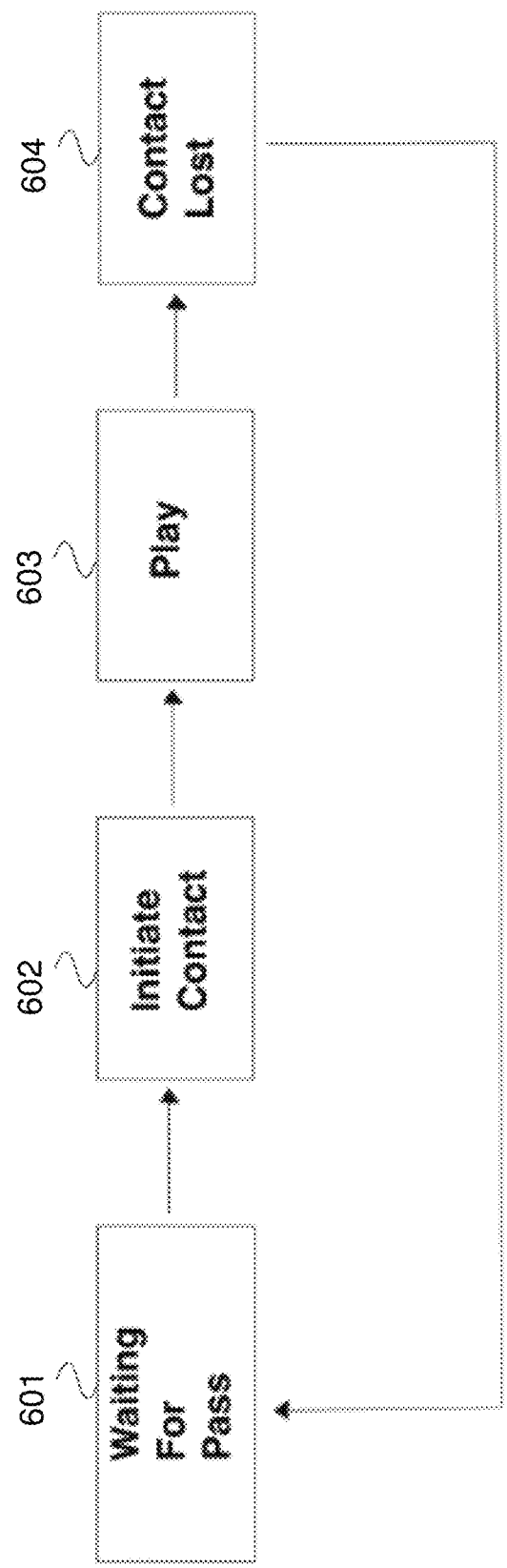
FIG. 6 illustrates a flow chart of an example process for operating an enclosed volume in space.

FIG. 6 illustrates a flow chart of an example process 600 for operating an enclosed volume in space under normal operations. The term "Play" is used herein to describe human interaction with the system, directing or controlling the robotic components. In the example in FIG. 6, step 601 includes waiting for pass, then initiating contact in step 602. Step 603 includes play. At step 504, contact is lost and the process 600 returns to step 601.

Figure 7:
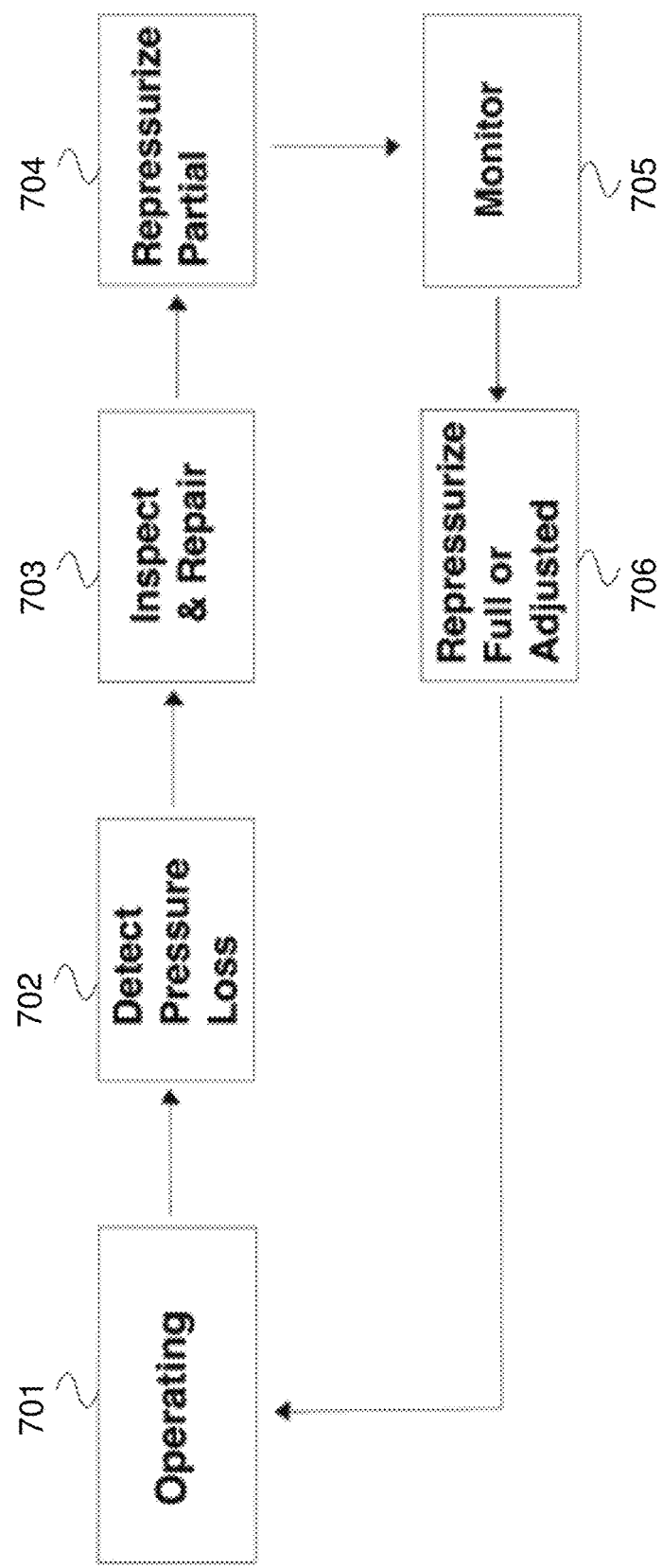
FIG. 7 is a flow chart of an example pressure loss and recovery method.

FIG. 7 is a flow chart of an example pressure loss and recovery method 700. In various embodiments, this process 700 can apply equally to any deformation of the membrane or unwanted change in the composition of the gas inside the enclosed volume where degraded operations or partial recovery is possible. For the method 700 in the example in FIG. 7, step 701 is operating. At step 702, a pressure loss is detected. Step 703 includes inspecting and repairing the pressure loss, and then step 704 includes partially repressurizing. Step 505 includes monitoring. Then, if the monitoring indicates the repair was successful, in step 706, full or adjusted repressurization is done and a return is made to the operating state in step 701.

Figure 8:
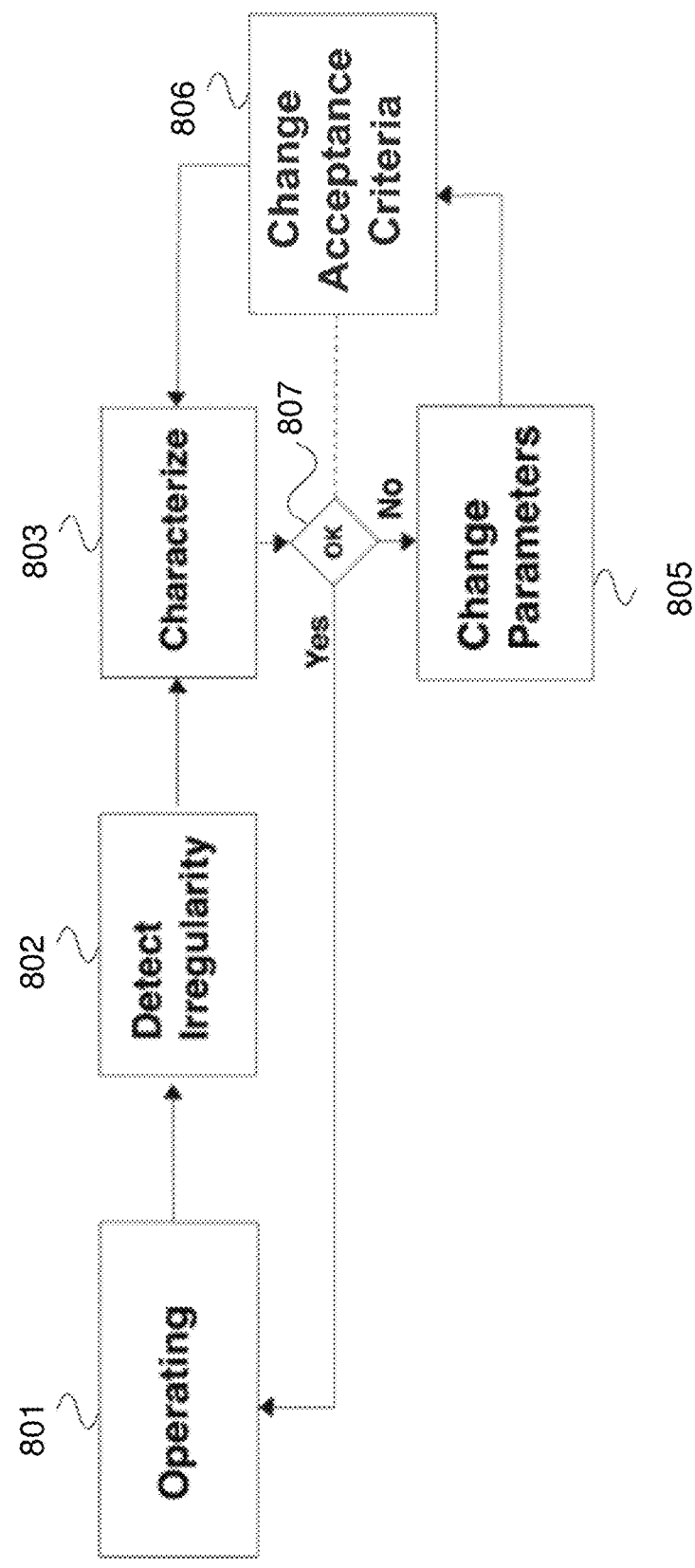
FIG. 8 is flow chart of an example method for recovering from a power irregularity.

FIG. 8 is flow chart of an example method 800 for recovering from a power irregularity. This process can apply equally to any degradation of system performance that may result from or be influenced by interactions of system components. For the method 800 in the example in FIG. 8, step 801 is operating. At step 802, a (power) irregularity is detected. Step 803 includes characterizing the irregularity. At step 807, a decision is made as to whether the characterization is ok, and if it is, the method proceeds back to the operating step 801. If the characterization in step 803 is determined to be not ok at step 807, the method proceeds to step 805 where parameters are changed, then to step 806 where the acceptance criteria is changed. After the acceptance criteria are changed, characterization at step 803 is performed again and the process proceeds to the decision step at 807 as explained above.

In some embodiments, the enclosed volume may be connected to an AI component including firmware and/or software. This AI component may enable the following example operations, actions, and/or functionalities: training for best lighting, best robot and sensor motion/alignment, best video capturing, calibration, self-calibration, object/human localization, object detection, detection-based monitoring and adjustment of sensors, real-time inference, real-time adjustment, real-time filtering, to name several examples.

Figure 9:
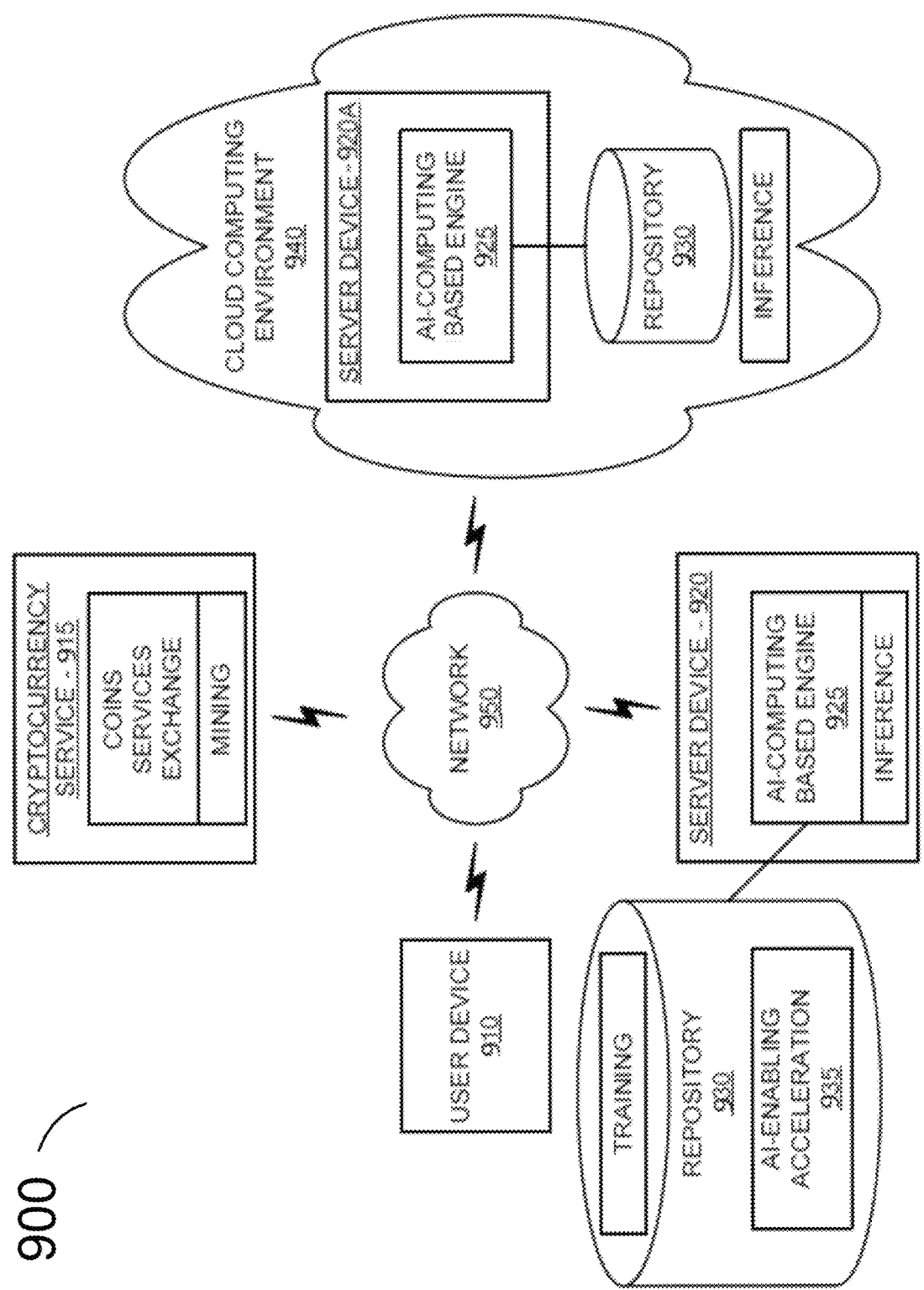
FIG. 9 is a diagram illustrating various aspects of an example computer infrastructure architecture including computing operations and an AI component.

FIG. 9 is a diagram illustrating various aspects of an example computer infrastructure architecture 900 including computing operations and an AI component (that may also be referred to herein as an AI-based-platform, and/or AI-based engine). The infrastructure architecture 900 includes a network 950 coupled to a user device 910, a repository 930 coupled to a server device 920, a cryptocurrency service 915, and elements in a cloud computing environment 940. The cryptocurrency service 915 in the example in FIG. 9 may include a coins services exchange and mining. The server device 920 may include an AI-computing based engine 925 and may also include an inference engine in some embodiments. The server device 920 is coupled to the repository 930 which can include AI-enabling acceleration 935 and a training component. In the cloud computing environment 940, there is also a repository 930, an inference engine, and a server device 920A where the server device 920A includes the AI-computing based engine 925 but is decoupled from the inference engine in the cloud computing environment 940 in this example.

Figure 10:
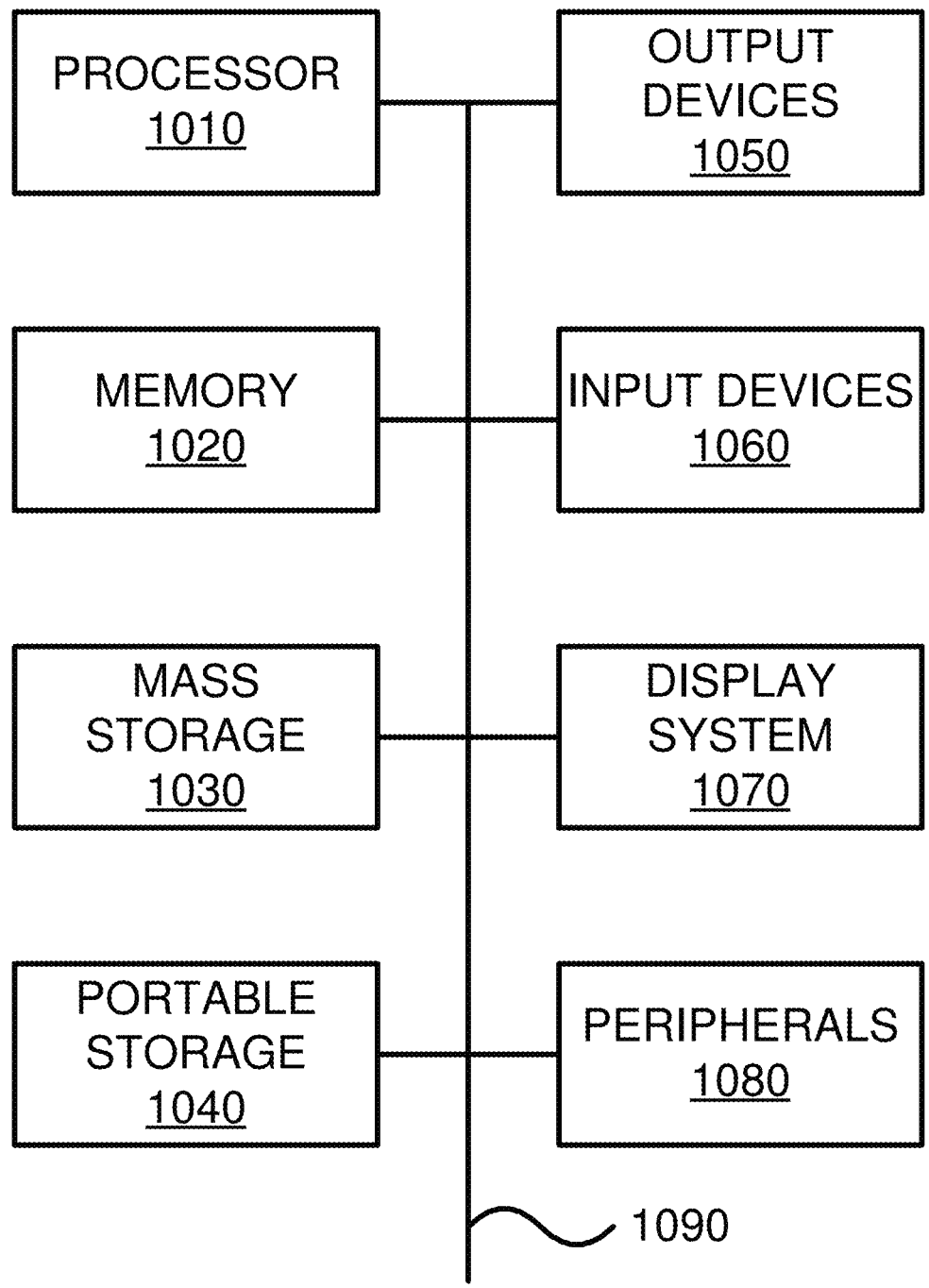
FIG. 10 is a simplified block diagram of an example computing system that may be used for implementing various aspects of the systems and/or methods described herein in some embodiments.

FIG. 10 is a simplified block diagram of an example computing system 1000 that may be used for implementing various aspects of the systems and/or methods described herein in some embodiments. The elements of FIG. 10 are described further near the end of this description for readability.

Figure 11:
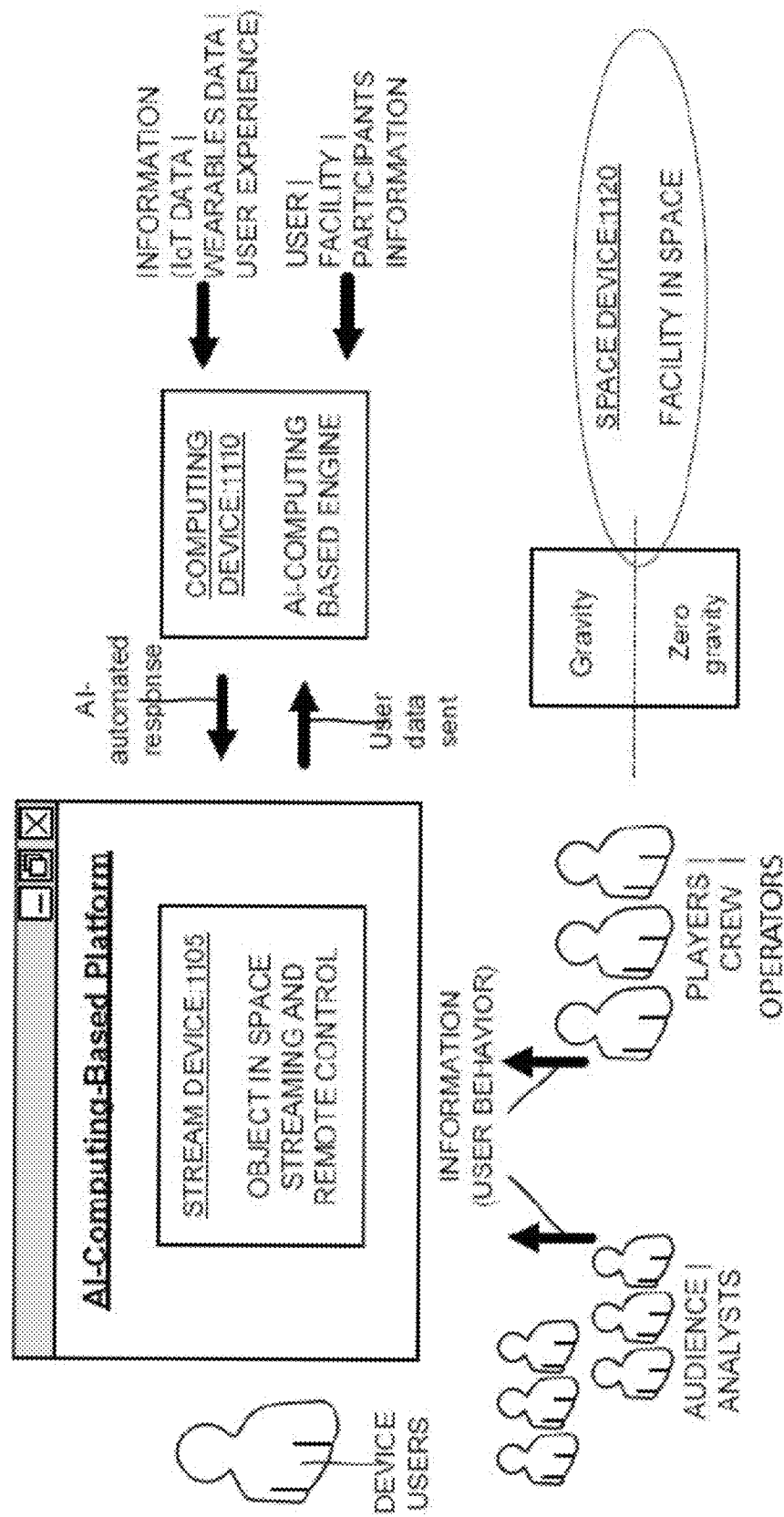
FIG. 11 depicts an example embodiment of a computer architecture of the enclosed volume including a space-located facility; a non-space located computing device/AI computing based engine and user interface.

FIG. 11 depicts an example embodiment of a computer architecture 1100 of the enclosed volume including a space-located facility; a non-space located computing device/AI computing based engine and user interface. In the example in FIG. 11, the AI-computing-based platform can include a stream device 1105 for device users for object in space streaming and remote control. AI training data may be generated and used, e.g., user behavior information regarding variously audience/analysts, player/crew/operators. The architecture 1100 also may include a computing device 110 that may receive as inputs information (Internet of Things (IoT) data/wearables data/user experience and other information and user data sent from the AI-computing-based platform, and the computing device 110 can send AI-automated response to the AI-computing-based platform. A space device 1120 facility in space is shown variously for gravity and zero gravity for the architecture 1100.

Figure 12:
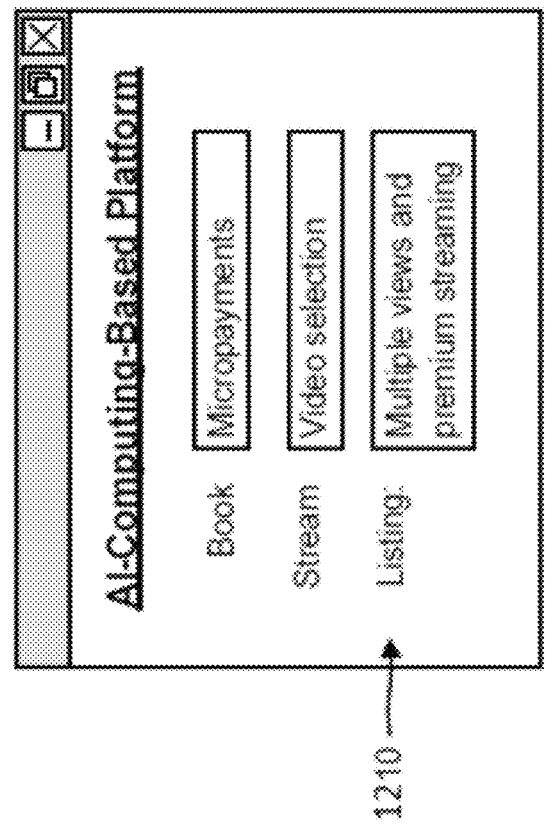
FIG. 12 shows an example embodiment of the user interface in FIG. 10 for performance of micropayments and transactions.

FIG. 12 shows an example user interface 1200 embodiment of a user interface in FIG. 11 for the AI-computing-based platform for performance of micropayments and transactions.

FIG. 13-FIG. 20 depict various additional aspect and embodiments for the enclosed volume. The enclosed volume may be inflatable and provide a flexible fuel tank and propellant metering for use in space operations. Various elements of the enclosed volume may come into contact with propellants and aerospace fluids. The use of devices that are not compatible with a liquid may damage the equipment and cause a leak that could result in property damage or personal injury. Various embodiments of the present technology provide compatibility with oxidizers, propellants, and other hazardous fluids for avoiding the aforementioned damage and injury. A compact physical spacecraft coupler may be provided that enables a physical connection (docking), fluid connection (liquid and/or gas) for fuel or oxidizer or pressurant gas, electrical power, electrical data, and combinations thereof. Couplers may be provided for attachment and fluid transfer, e.g., for the enclosed volume. In various embodiments, a compact physical spacecraft coupler may be provided that enables a physical connection (docking), fluid connection (liquid and/or gas) for fuel or oxidizer or pressurant gas, electrical power, electrical data, and combinations thereof.

In various embodiments, a flex tank/inflatable volume is provided that can have a toroidal or dumbbell layout, provide blowdown functionality, flexibility and is designed for in-space use.

Bipropellant (BiProp) e.g., two types of propellants) and fuel/blowdown may be provided. The fuel/blowdown may include blowdown gas supply and fuel via a single coupler or two couplers side by side. In blowdown mode, the tank can be loaded with propellant and 'locked-up with the blowdown gas mass. This blowdown mode may avoid the need for additional gas pressurant vessels thereby reducing mass, volume and propulsion systems complexity. Bipropellant support may be provided via a single double core coupler (e.g., having two fluid cores) or two couplers side by side. The "two couplers side by side", when one is male and the other is female, can create a single androgynous coupling with two fluid ports. In various embodiments, fuel tanks are provided with a compact coupling. Further details regarding the coupler and in particular the compact coupler for attachment and fluid transfer are described in pending U.S. patent application Ser. No. 16/126,883, filed on Sep. 10, 2018, entitled "Systems and Methods for Delivering, Storing, and Processing Materials in Space" which is incorporated in its entirety herein by reference for all purposes. Further details regarding embodiments of an inflatable volume layout, fuel tanks, flexible tanks, deployables/Flex Tank deployment, propellant metering, and achieving materials compatibility are described further below.

Figure 13:
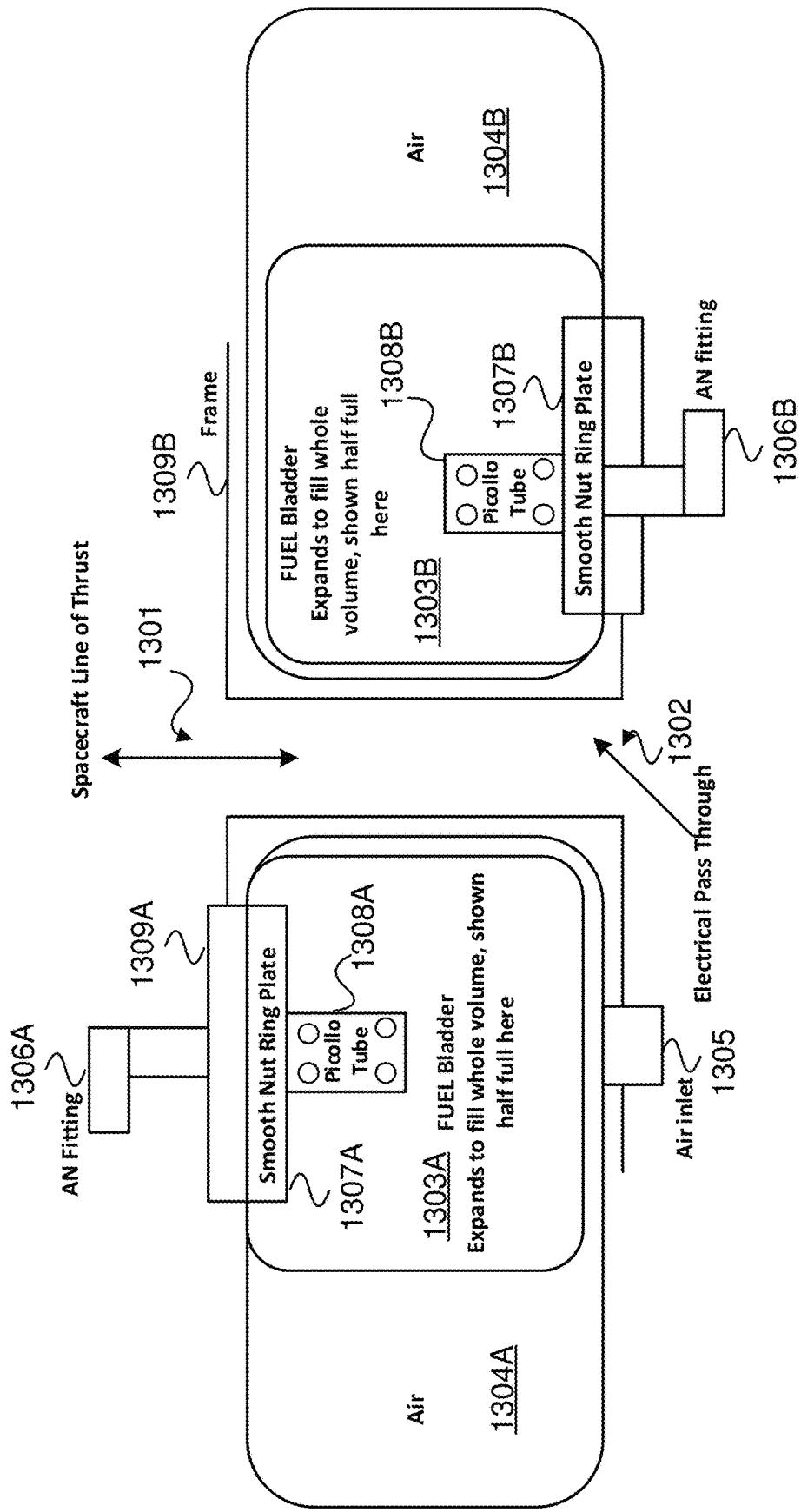
FIG. 13 illustrates an example layout of a toroidal flexible container (e.g. tank) for optimal material properties and fuel inlet/outlet available, according to various embodiments.

FIG. 13 illustrates an example layout 1300 of a toroidal flexible tank for optimal material properties and fuel inlet/outlet available, according to various embodiments. The flexible tank is also referred to herein variously as a Flex-Tank.

Figure 19:
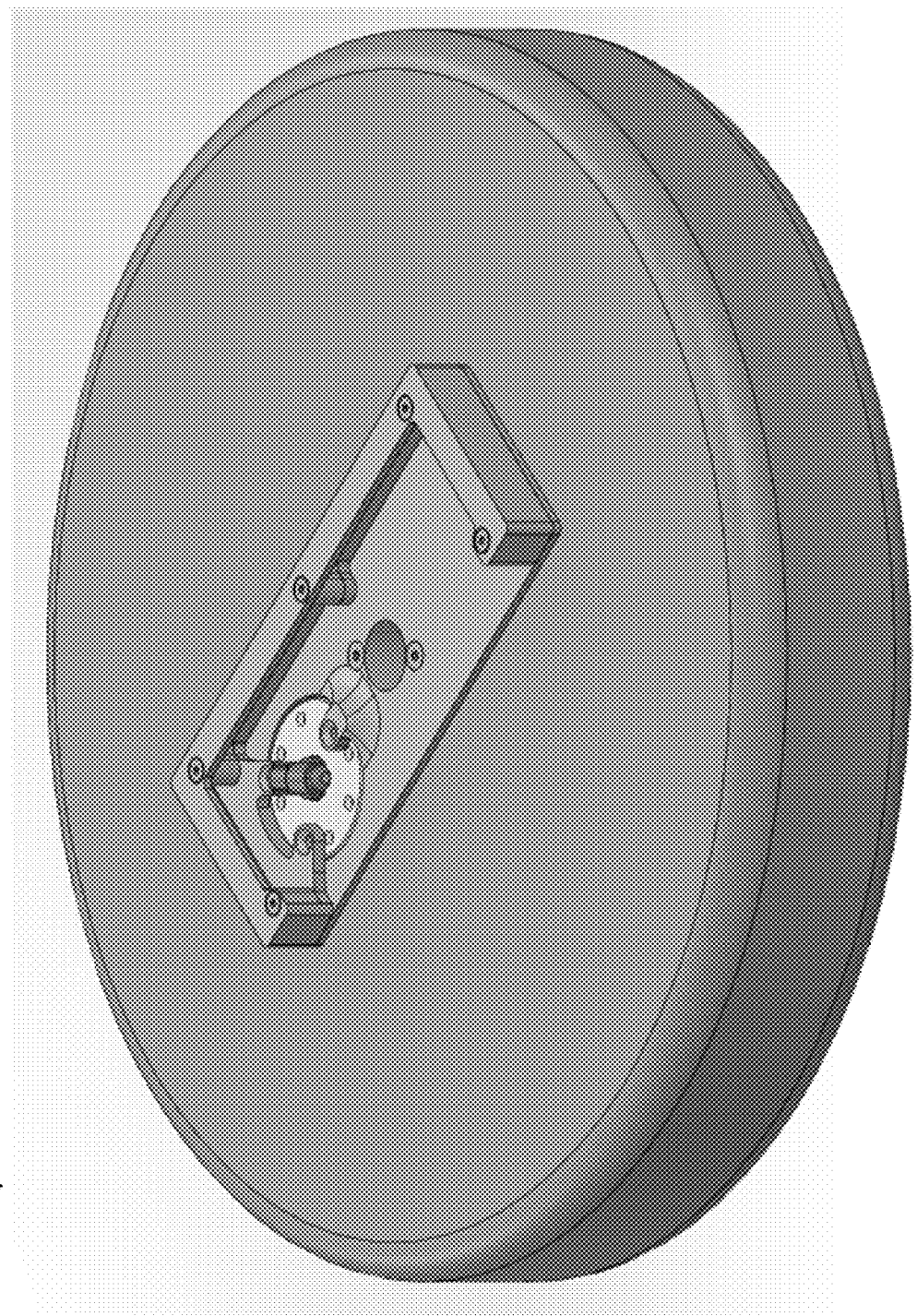
FIG. 19, FIG. 20, and FIG. 21 show various views of the FlexTank, according to various embodiments.
Figure 20:
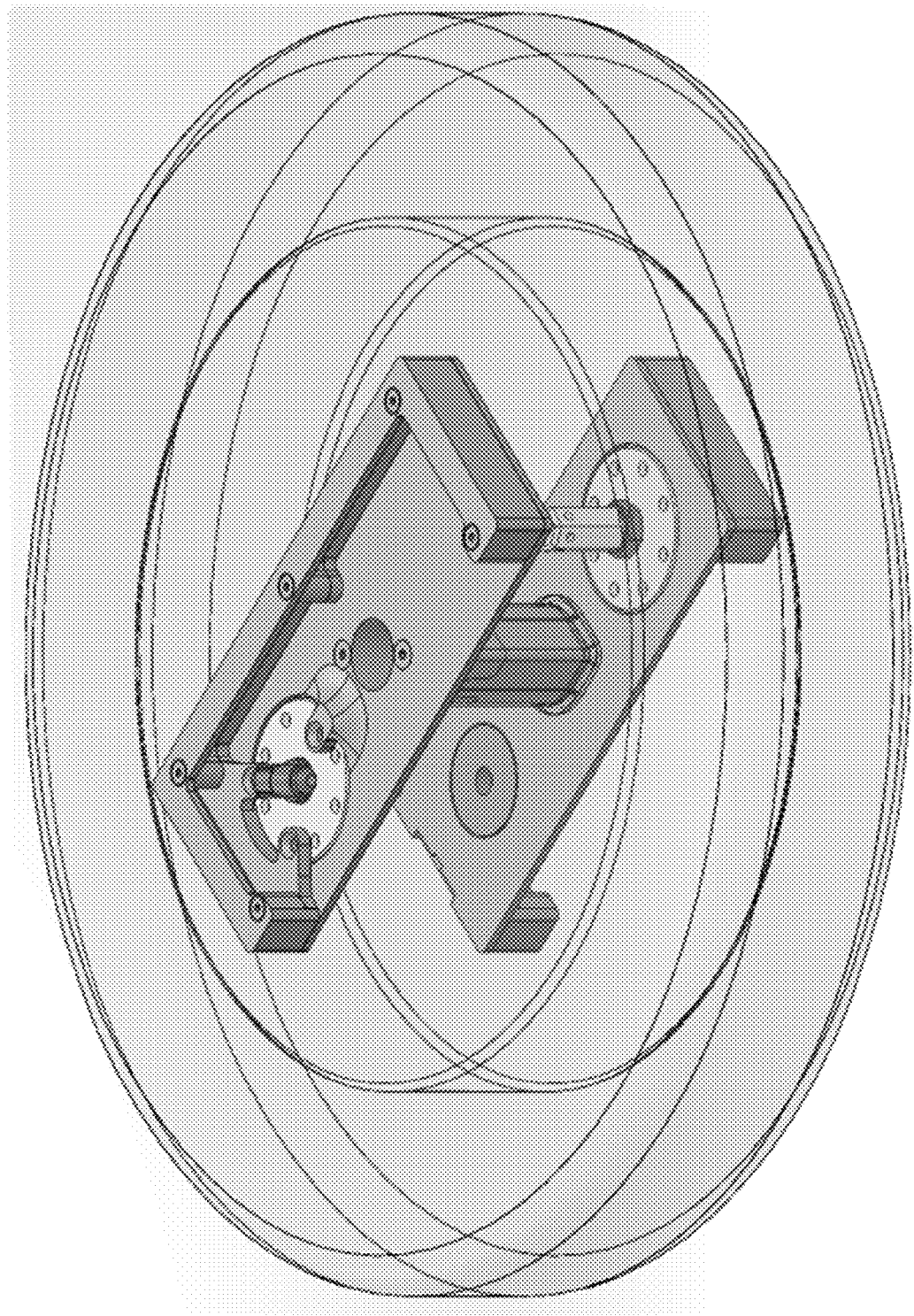
Figure 21:
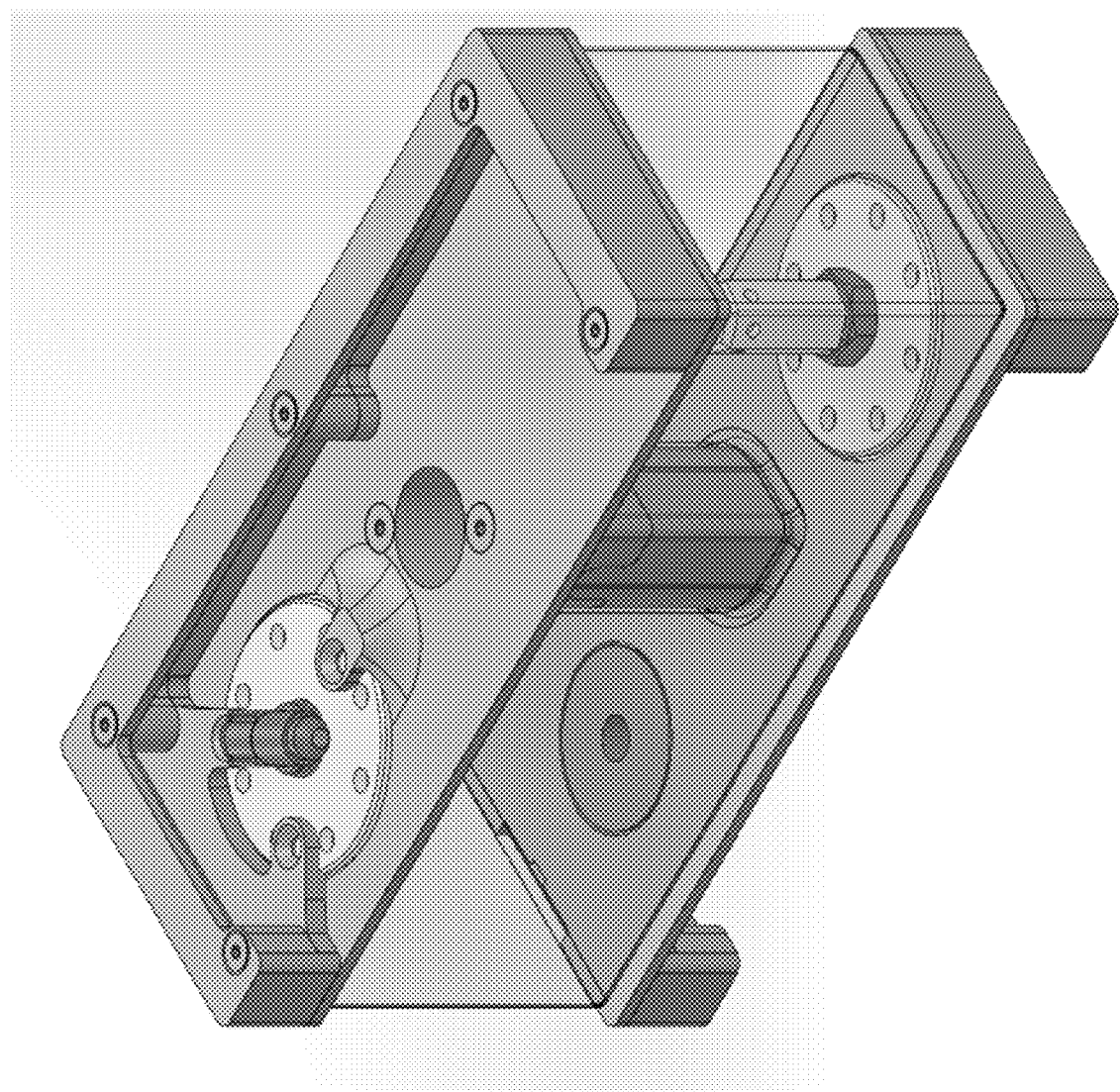

FIG. 19, FIG. 20, and FIG. 21 show various views of the flextank, according to various embodiments. Although a toroidal flex tank is illustrated in this example, the present technology is not limited to that example shape. Other shapes such as dumbbell, for example, may be used Using this example layout in FIG. 13, a material compatibility benefit can be derived. More specifically, the example layout has in some embodiments, a Hydrazine/Green Monoprop/aerospace fuel layer inside a vacuum/air layer. This example layout makes the geometry much simpler and significantly improves the materials compatibility. In some embodiments, the fuel layer must only be hydraine/green monoprop complaint and the air outer layer must be structural, air compliant and vacuum compliant.

The example layout 1300 shows two sections of the toroidal flextank for description purposes with the spacecraft line of thrust 1301 and electrical pass through 1302 between the sections. The layout 300 also shows fuel bladders 1303A, 1303B, air sections 1304A, 1304V, an air inlet 1305, AN fittings 1306A, 1306B, smooth nut ring plates 1307A, 1307B, Piccolo tubes 1308A, 1308B, and frame 1309A, 1309B. The fuel bladder 1303A, 1303B expands to fill the whole volume, shown half full in FIG. 13 for illustration.

The Piccolo tubes 1308A, 13.08B can be for use with flexible packable blowdown bladder tanks, and may be coupled to corresponding smooth nut ring plates 1307A, 1307B, as shown in the example in FIG. 13. In some embodiments, custom machined smooth nut ring plates 1307A, 1307B are included to capture the screws inside the bladder 1303A, 1303B in a way that prevents no tear potential.

For having a manifold as bulkhead in flex tank layout 1300, AN fittings 1306A, 1306B may be used. In some embodiments, a bulkhead manifold may be built into the flex tank to allow multiple devices direct connection.

The flexible spacecraft fuel tanks according to various embodiments allow for constant center of mass through various levels of inflation. The toroidal shape with a hollow center in the example in FIG. 13 can enable this constant center of mass through various levels of inflation.

For the electrical pass through 1302, wire can pass through in the flexible fuel tank, with dual side fuel access. Fuels, in various embodiments, may be waste water/salty brine from a space station waste-water bus. In some embodiments, other water from the International Space Station (ISS) may be used as fuel.

FIG. 14 illustrates certain configurations 1400 of the uses of flexible tanks (e.g., at a spacecraft system level) according to various embodiments. In the example in FIG. 14, this is a FlexTank that is just the inflatable section with a coupler 1401 on each of two opposing faces. The flexible container is referred to herein variously as a FlexTank, flexible tank, and FlexPod. In various embodiments, it is to be a switchable and/or addon tank to be attached externally to a satellite or other host In some embodiments, a Rafti (type) coupler may be used for coupler 1401. The flexible tank housing is identified as 1402 in the example in FIG. 14. For the "FlexPod Deployed" configuration in FIG. 14, the flexible tank is shown as an expanded toroidal 1403. In various embodiments, one or more flexible containers (e.g., tanks, pods) each comprises an inflatable section; one or more flexible container housings, each for housing a respective one of the one or more flexible containers; and for each of the one or more flexible containers, a coupler positioned on each of opposite sides of the respective flexible container housing, each coupler for coupling to another of the one or more flexible containers.

FIG. 15, FIG. 16, FIG. 17, and FIG. 18 illustrate various aspects of deployables and FlexTank deployment, according to various embodiments. FIG. 15-FIG. 18 show aspects of the flexible tank capture behind doors for launch, transport etc. according to various embodiments. One or more doors can restrain and physically constrain the stowed flexible tank. The one or more doors may comprise fabric or membrane sheets.

Figure 15:
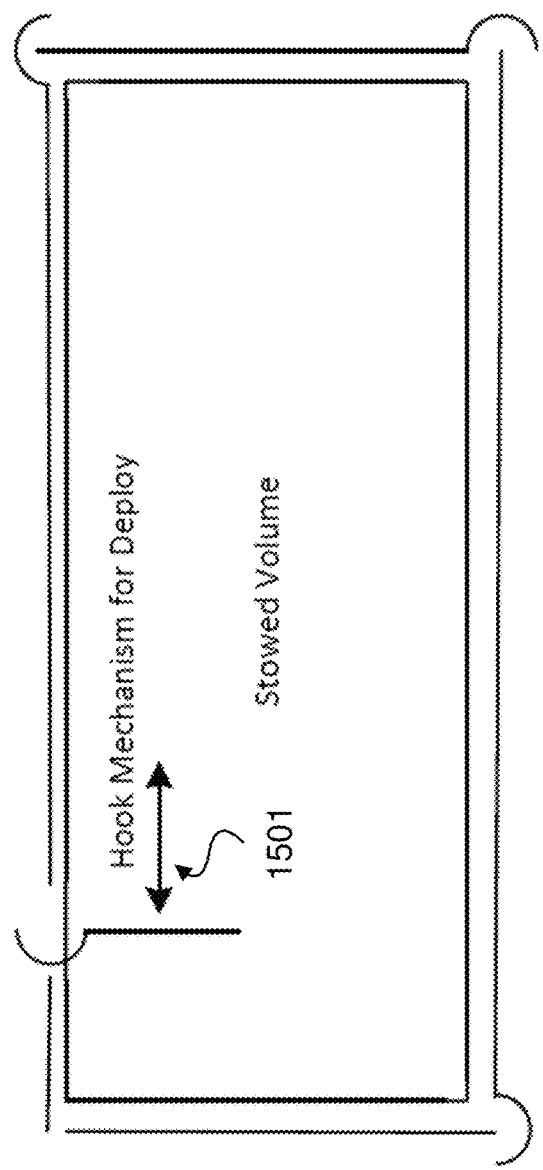
FIG. 15, FIG. 16, FIG. 17, and FIG. 18 illustrate various aspects of deployables and flexible container (e.g., Flex-Tank) deployment, according to various embodiments.
Figure 17:
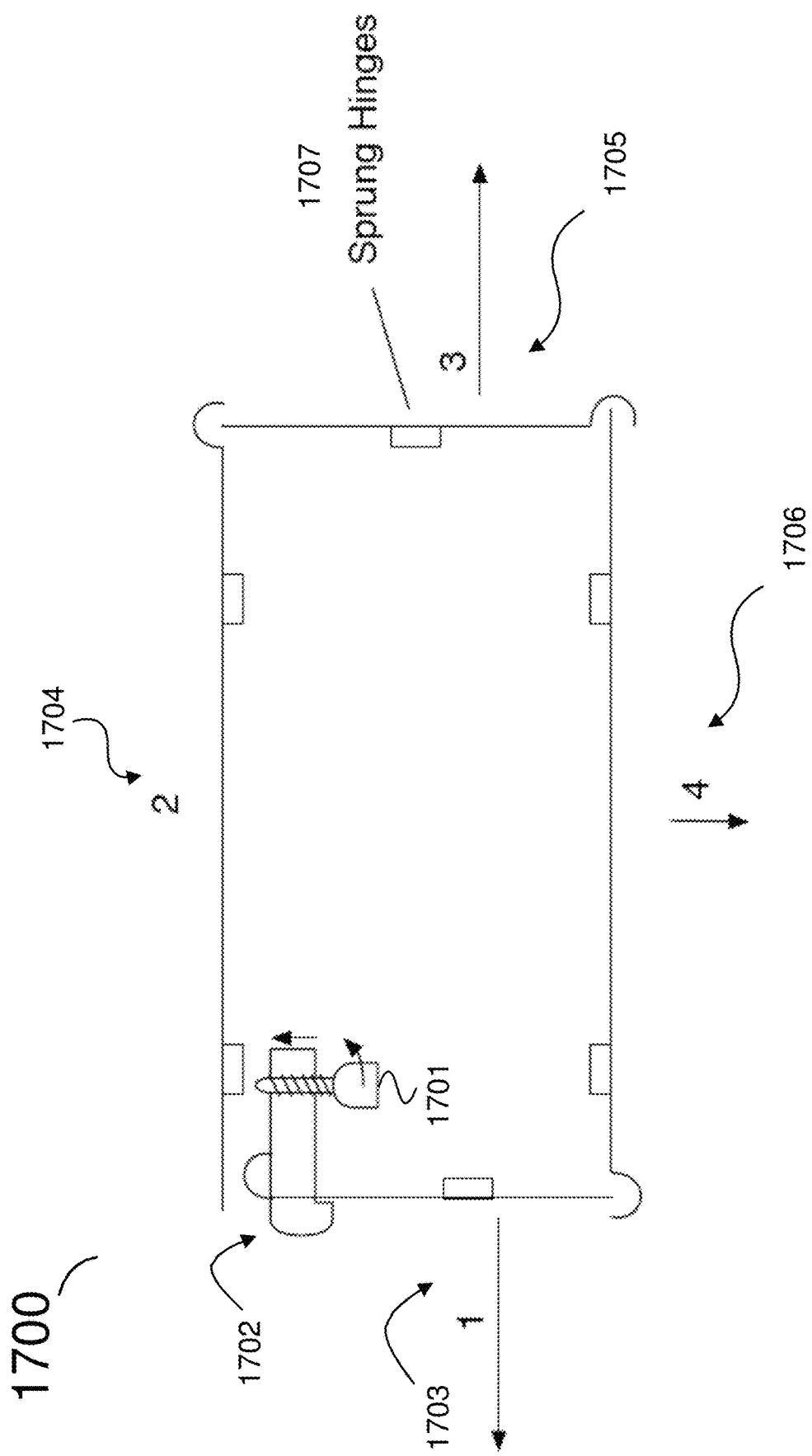

FIG. 15 and FIG. 17 illustrate aspects of example embodiments 1500 and 1700, respectively, having a single hook mechanism to release four panels or doors with one actuator. For these "single hook" embodiments, there may be a "flower petal" door or solar panel hold down. In operation, a stepper motor 1701 (shown in the example in FIG. 17) pushes the single hook (see at 1702 in FIG. 17 and at 1601 in FIG. 15), the single hook 1702 releases a door one (see 7103), and then door two is released (see 1704), etc. till all doors are released (see 1705, 1706, for the third and fourth doors in this example). In some embodiments, hinges 1707 (shown in FIG. 17) assist in the operation.

Figure 16:
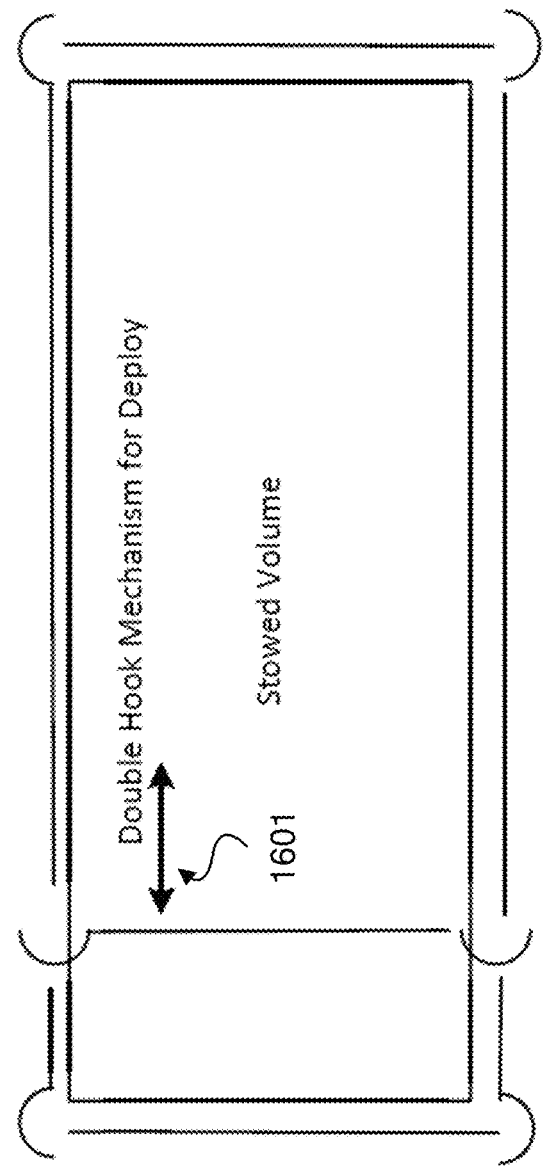
Figure 18:
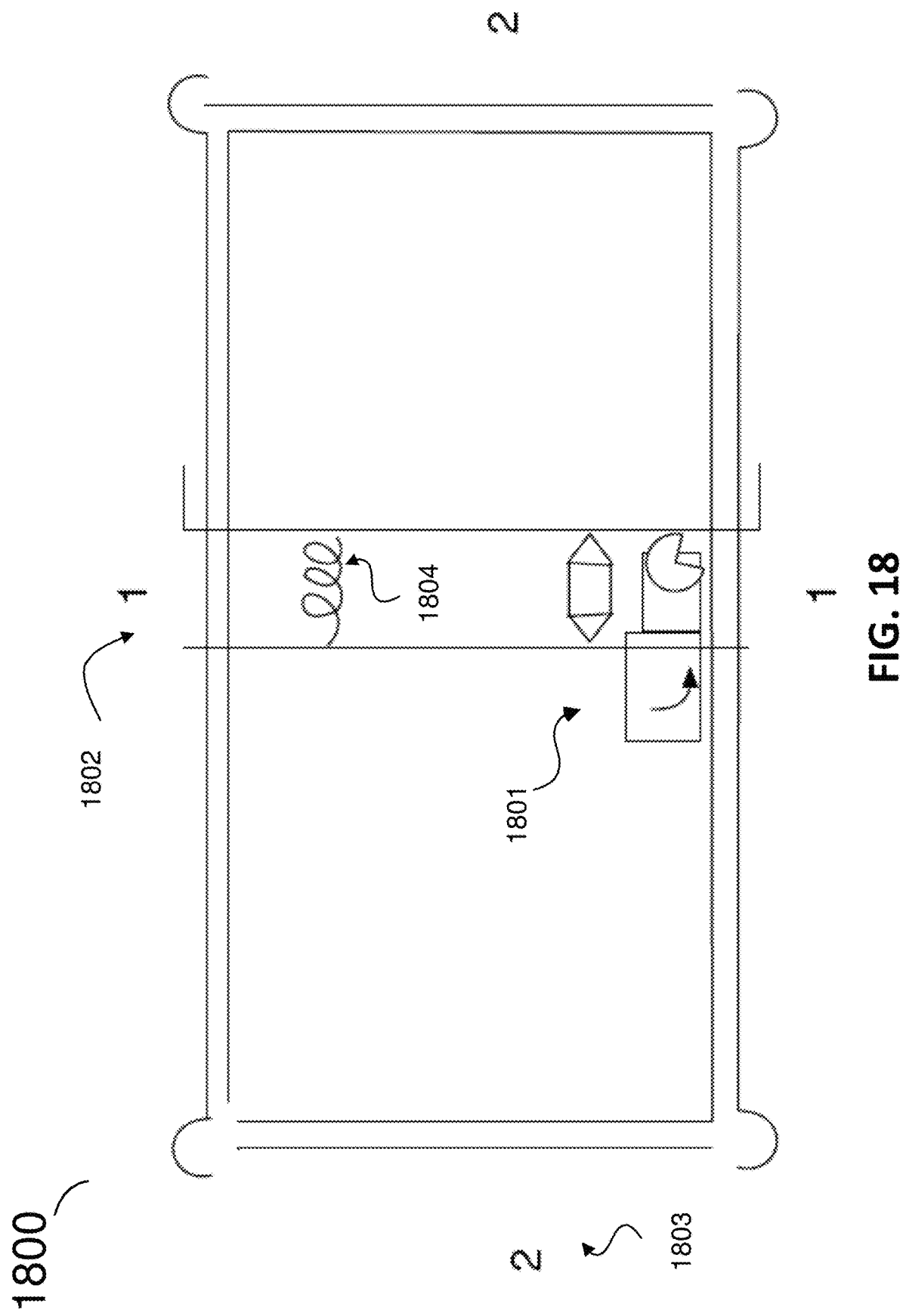

FIG. 16 and FIG. 18 illustrate aspects of example embodiments 1600 and 1800, respectively, having a double hook mechanism (see e.g., at 1601 FIG. 16, at 1801 in FIG. 18) to release four panels or doors with one actuator. In operation, motor spins translate to pin movement; the mechanism pushes the double hook 1801; springs (see e.g., 1804) assist hook in moving consistency; then the doors 1 open (see 1802 in FIG. 18), then doors 2 (see 1803 in FIG. 18) are released as was held down by door 1.

Figure 22:
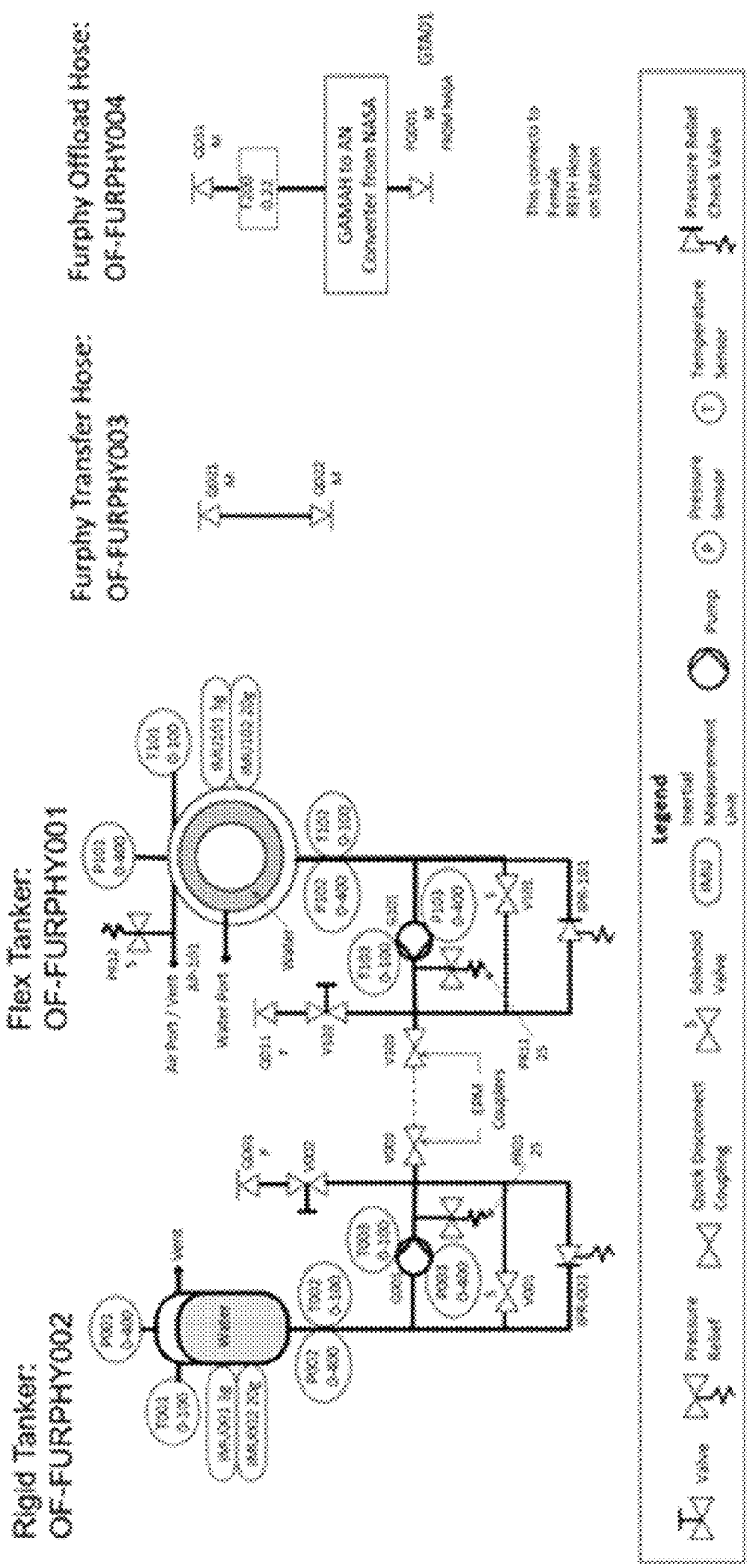
FIG. 22 is a diagram illustrating various aspects of example pressure and instrumentation associated with metering of propellants, according to some embodiments.

FIG. 22 is a diagram illustrating various aspects of example pressure and instrumentation associated with metering of propellants, according to some embodiments. In various embodiments, fluid control and management are provided, including metering. A combination mechanical electrical system may be used for cut off at pressure (e.g., using a check valve to flood a compartment and trigger an electrical mechanism). The process can include filling the flex tank, then pumping to empty to be primed 'wet' but empty, instead of containing gas (e.g., to reduce bubble inclusion). The vacuum pump may be included on the flexible tank prior to loading. In some embodiments, a normally open pump can bypass the valve to allow pumping into a non-cooperative vehicle. Strain gauges can be included on the blowdown tank for fill level detection. The plumbing system for the example in FIG. 22 can allow bi-directional pumping and receiving of fuels in space. In various embodiments, the tank fill can be determined from characterized flight dynamics. A gas generator can fill blow down volumes on aerospace fuel tanks.

Turning back to FIG. 10, this figure illustrates an exemplary computer system 1100 that may be used to implement some embodiments of the present invention. The computer system 1100 in FIG. 11 may be implemented in the contexts of the likes of computing systems, networks, servers, or combinations thereof. The computer system 1100 in FIG. 11 includes one or more processor unit(s) 1110 and main memory 1120. Main memory 1120 stores, in part, instructions and data for execution by processor unit(s) 1110. Main memory 1120 stores the executable code when in operation, in this example. The computer system 1100 in FIG. 11 further includes a mass data storage 1130, portable storage device 1140, output devices 1150, user input devices 1160, a graphics display system 1170, and peripheral device(s) 1180.

The components shown in FIG. 11 are depicted as being connected via a single bus 1190. The components may be connected through one or more data transport means. Processor unit(s) 1110 and main memory 1120 are connected via a local microprocessor bus, and the mass data storage 1130, peripheral device(s) 1180, portable storage device 1140, and graphics display system 1170 are connected via one or more input/output (I/O) buses.

Mass data storage 1130, which can be implemented with a magnetic disk drive, solid state drive, or an optical disk drive, is a non-volatile storage device for storing data and instructions for use by processor unit(s) 1110. Mass data storage 1130 stores the system software for implementing embodiments of the present disclosure for purposes of loading that software into main memory 1120.

Portable storage device 1140 operates in conjunction with a portable non-volatile storage medium, such as a flash drive, floppy disk, compact disk, digital video disc, or Universal Serial Bus (USB) storage device, to input and output data and code to and from the computer system 1100 in FIG. 11. The system software for implementing embodiments of the present disclosure is stored on such a portable medium and input to the computer system 1100 via the portable storage device 1140.

User input devices 1160 can provide a portion of a user interface. User input devices 11110 may include one or more microphones, an alphanumeric keypad, such as a keyboard, for inputting alphanumeric and other information, or a pointing device, such as a mouse, a trackball, stylus, or cursor direction keys. User input devices 1160 can also include a touchscreen. Additionally, the computer system 1100 as shown in FIG. 11 includes output devices 1150. Suitable output devices 1150 include speakers, printers, network interfaces, and monitors.

Graphics display system 1170 include a liquid crystal display (LCD) or other suitable display device. Graphics display system 1170 is configurable to receive textual and graphical information and processes the information for output to the display device.

Peripheral device(s) 1180 may include any type of computer support device to add additional functionality to the computer system.

Some of the components provided in the computer system 1100 in FIG. 11 can be those typically found in computer systems that may be suitable for use with embodiments of the present disclosure and are intended to represent a broad category of such computer components. Thus, the computer system 1100 in FIG. 11 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1100 may be implemented as a cloud-based computing environment, such as a virtual machine operating within a computing cloud. In other embodiments, the computing system 1100 may itself include a cloud-based computing environment, where the functionalities of the computing system 1100 are executed in a distributed fashion. Thus, the computing system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1100, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A flexible container for a host to be deployed for space operations, the flexible container comprising:
   a membrane having a fluid barrier layer and being configured to contain a propellant gas or fluid;
   an expulsion device configured to expel material from the membrane;
   the flexible container being configurable between a stowed configuration and a deployed configuration, in the stowed configuration, the flexible container being contained within the host, and in the deployed configuration, the flexible container remaining attached to the host and extending away from the host; and
   the flexible container being configured to change to the deployed configuration when the flexible container is in an extraterrestrial environment.

2. The flexible container of claim 1, wherein the flexible container is a flexible tank configured to expand from one shape, in an undeployed configuration, to another shape, in a deployed configuration, wherein the other shape has a hole in the middle.

3. The flexible container of claim 1, further including at least one coupler for transferring the propellant between the flexible container and the host.

4. The flexible container of claim 2, further including at least one coupler for transferring the propellant between the flexible container and the host.

5. The flexible container of claim 3, wherein the membrane is configured to contain a bipropellant using two types of propellant, the at least one coupler comprising a single coupler having at least two fluid cores or two side by side couplers.

6. The flexible container of claim 3, wherein a blowdown gas supply and fuel are provided via the at least one coupler, wherein the at least one coupler comprises a single coupler having at least two fuel cores or two side by side couplers.

7. The flexible container of claim 4, wherein a blowdown gas supply and fuel are provided via the at least one coupler, wherein the at least one coupler comprises a single coupler having at least two fuel cores or two side by side couplers.

8. The flexible container of claim 7, further comprising strain gauges on the blowdown gas supply for fill level detection.

9. The flexible container of claim 1, wherein the membrane is multi-layered having separate functional layers including: an inner layer for separating fuel from air or another blowdown gas, wherein the inner layer is the fluid barrier layer; another layer for separating air from an outside fluid or medium, and a mechanical restraint layer.

10. The flexible container of claim 9, wherein the mechanical restraint layer comprises a strapping, a webbing, a netting, or non-porous material.

11. The flexible container of claim 1, further comprising one or more doors for restraining and physically constraining the flexible container, wherein the flexible container is configured with the one or more doors for launch and transport, the flexible container being configured to release the doors for deployment using a release mechanism.

12. The flexible container of claim 11, wherein the flexible container is configured with four doors and the release mechanism comprises a double hook mechanism to release the four doors using one actuator.

13. The flexible container of claim 11, wherein the flexible container is configured with four doors and the release mechanism comprises a single hook mechanism to release the four doors using one actuator.

14. The flexible container of claim 1, wherein the stowed configuration comprises the flexible container being folded within a receptacle of the host.

15. The flexible container of claim 1, wherein the membrane comprises a vacuum compatible material.

16. The flexible container of claim 1, wherein the membrane is configured as a balloon and is pressurized relative to an external environment.

17. The flexible container of claim 1, comprising an outer flexible bladder, the expulsion device comprising an inner flexible bladder positioned within the outer flexible bladder, the inner flexible bladder being configured to expand within the outer flexible bladder to expel material from the flexible container.

18. The flexible container of claim 1, wherein the inner flexible bladder is configured to expand by gas provided by a gas source carried by the host.

19. The flexible container of claim 1, wherein the host is a satellite, a launch vehicle, or a stage of the launch vehicle.

20. The flexible container of claim 9, further comprising a micrometeroid and orbital debris shield layer having a single- or multi-layer Whipple shield configuration.

21. The flexible container of claim 9, wherein the fluid barrier layer comprises an ethylene propylene diene monomer (EPDM) rubber.

22. The flexible container of claim 11, wherein the one or more doors comprise fabric or membrane sheets.

23. The flexible container of claim 1, wherein the flexible container is a flexible tank configured to expand from one shape, in an undeployed configuration, to another shape, in a deployed configuration, wherein the other shape is a dumbbell shape.

24. The flexible container of claim 1, further including at least one coupler for transferring the propellant gas or fluid between the flexible container and a satellite, the satellite being other than the host.

25. The flexible container of claim 2, further including at least one coupler for transferring the propellant gas or fluid between the flexible container and a satellite, the satellite being other than the host.

26. The flexible container of claim 10, wherein the separate functional layers of the membrane are combined or bonded.

27. The flexible container of claim 1, wherein the membrane contains one or more volumes, each volume of the one or more volumes for holding different or similar fluids and blow down gasses, each volume of the one or more volumes being separated by one or more layers.

28. A flexible container system comprising:
two or more flexible containers each comprising an inflatable section;
two or more flexible container housings, each for housing a respective one of the two or more flexible containers; and
for each of the two or more flexible containers, a coupler positioned on each of opposite or adjacent sides of the respective flexible container housing, each coupler coupling one of the flexible containers to another of the flexible containers.

29. The flexible container system of claim 28, wherein at least one of the flexible containers is configurable between a stowed configuration and a deployed configuration, wherein when the at least one of the flexible containers is in the deployed configuration, the at least one of the flexible containers has a toroidal shape.

30. The flexible container system of claim 28, wherein two or more of the flexible containers is carried by a spacecraft or a host.

* * * * *